United States Patent
Oh et al.

(10) Patent No.: US 9,618,792 B2
(45) Date of Patent: Apr. 11, 2017

(54) BACKLIGHT UNIT AND DISPLAY DEVICE HAVING THE SAME

(71) Applicant: LG Electronics Inc., Seoul (KR)

(72) Inventors: Jinmok Oh, Seoul (KR); Byoungkwon Cho, Seoul (KR); Hyunkwon Shin, Seoul (KR); Jinwoo Sung, Seoul (KR)

(73) Assignee: LG Electronics Inc., Seoul (KR)

( * ) Notice: Subject to any disclaimer, the term of this patent is extended or adjusted under 35 U.S.C. 154(b) by 157 days.

(21) Appl. No.: 14/635,858

(22) Filed: Mar. 2, 2015

(65) Prior Publication Data

US 2015/0378216 A1 Dec. 31, 2015

Related U.S. Application Data

(60) Provisional application No. 62/018,275, filed on Jun. 27, 2014.

(30) Foreign Application Priority Data

Oct. 1, 2014 (KR) .................. 10-2014-0132551

(51) Int. Cl.
*G02F 1/1335* (2006.01)
(52) U.S. Cl.
CPC ...... *G02F 1/133609* (2013.01); *G02F 1/1336* (2013.01); *G02F 1/133603* (2013.01); *G02F 1/133606* (2013.01); *G02F 2001/133614* (2013.01); *G02F 2202/36* (2013.01)
(58) Field of Classification Search
None
See application file for complete search history.

(56) References Cited

U.S. PATENT DOCUMENTS

| | | | |
|---|---|---|---|
| 2006/0109682 A1 | 5/2006 | Ko et al. | |
| 2010/0193806 A1 | 8/2010 | Byun | |
| 2012/0113672 A1* | 5/2012 | Dubrow | B82Y 20/00 362/602 |
| 2012/0176812 A1 | 7/2012 | Hwang et al. | |
| 2012/0195340 A1 | 8/2012 | Cheon et al. | |
| 2012/0281428 A1* | 11/2012 | Davis | G02B 6/0041 362/555 |
| 2013/0120678 A1 | 5/2013 | Chao et al. | |
| 2013/0215645 A1 | 8/2013 | Jang et al. | |

(Continued)

FOREIGN PATENT DOCUMENTS

| | | |
|---|---|---|
| CN | 102980136 A | 3/2013 |
| CN | 103487857 A | 1/2014 |

(Continued)

*Primary Examiner* — Ryan Crockett
(74) *Attorney, Agent, or Firm* — Birch, Stewart, Kolasch & Birch, LLP

(57) ABSTRACT

A backlight unit including a plurality of light sources configured to emit primary light, and a quantum dot composite. The quantum dot composite includes quantum dot phosphors excited by primary light supplied from the plurality of light sources so as to emit secondary light having a different wavelength than the primary light, and scattering particles that are configured to scatter the primary light. The scattering particles include first scattering particles, and second scattering particles different from the first scattering particles in size and composed of particles each having a diameter in the range of 5 to 50 nm.

20 Claims, 16 Drawing Sheets

(56) References Cited

U.S. PATENT DOCUMENTS

| | | |
|---|---|---|
| 2013/0265506 A1 | 10/2013 | Nishimura et al. |
| 2014/0056024 A1 | 2/2014 | Kim et al. |
| 2014/0119049 A1 | 5/2014 | Kim et al. |
| 2014/0153217 A1 | 6/2014 | Kang |

FOREIGN PATENT DOCUMENTS

| | | |
|---|---|---|
| JP | 2006-146115 A | 6/2006 |
| JP | 2013-105747 A | 5/2013 |
| KR | 10-2010-0088830 A | 8/2010 |
| KR | 10-2012-0018490 A | 3/2012 |
| KR | 10-2012-0080719 A | 7/2012 |
| KR | 10-2012-0088273 A | 8/2012 |
| KR | 10-2013-0041336 A | 4/2013 |
| KR | 10-2013-0044032 A | 5/2013 |
| KR | 10-2013-0084506 A | 7/2013 |
| KR | 10-2013-0095955 A | 8/2013 |
| KR | 10-2013-0120486 A | 11/2013 |
| KR | 10-2014-0026794 A | 3/2014 |
| KR | 10-2014-0056490 A | 5/2014 |

\* cited by examiner

BACKLIGHT UNIT AND DISPLAY DEVICE HAVING THE SAME

CROSS-REFERENCE TO RELATED APPLICATIONS

Pursuant to 35 U.S.C. §119(a), this application claims the benefit of earlier filing date and right of priority to U.S. Provisional Application No. 62/018,275, filed on Jun. 27, 2014, and Korean Application No. 10-2014-0132551, filed in the Republic of Korea on Oct. 1, 2014, the contents of which are incorporated by reference herein in their entireties.

BACKGROUND OF THE INVENTION

Field of the Invention

This specification relates to a backlight unit using quantum dot phosphors, and more particularly, a backlight unit for realizing high efficiency and a display device having the same.

Background of the Invention

A backlight unit serves to emit light to a rear surface of a liquid crystal panel such that an image can be viewed by a user. Since the liquid crystal panel is unable to emit light by itself, the backlight unit should evenly emit light onto the rear surface of the liquid crystal panel, such that the user can visually recognize an image output on a display device. The backlight unit is provided with multiple light sources. With the development of technologies, light-emitting diodes (LEDs) have started to be used for the backlight unit, which replace cold cathode fluorescent lamps (CCFLs). The LED has many advantages, as compared with the CCFL, in view of less power consumption, an extended lifespan, a facilitated fabrication in a small size and the like.

There may be several methods of generating white light in a backlight unit using the LED as the light source. A representative method of generating white light may be a combination of light emitted from LEDs which emit blue light, red light and green light, respectively. However, this method requires too many LEDs and an additional feedback system, causing an increase in the fabrication costs of a display device.

Another method of generating white light may be a combination of an LED which emits blue light and yellow (YAG) phosphors. This method only requires about one third (⅓) of the LEDs employed in the combining method of the blue, red and green light emitting LEDs, and does not need the feedback system, thereby saving fabricating costs of a display device. However, this method has limited color reproduction.

To overcome such limitations, a method of replacing the conventional yellow phosphors with quantum dots (QD) has recently been reported. The quantum dots (QD) have different properties than typical phosphors. The quantum dots have a property of emitting different wavelengths of light depending on a type of material and a size of a particle. For example, quantum dots emit short wavelengths of light when particles are small in size, and emit long wavelengths of light when the particles become large in size. Therefore, by adjusting the size of the quantum dots, light with desired wavelengths from infrared to ultraviolet regions can be obtained.

The quantum dot phosphors are excited by primary light supplied from light sources to emit secondary light which has a different wavelength from the primary light. Here, the primary light refers to light supplied from the light sources, namely, light which excites the quantum dot phosphors. The secondary light refers to light emitted from the quantum dot phosphors.

To emit sufficient secondary light, a sufficient amount of quantum dot phosphors is required. However, an increase in the amount of the quantum dot phosphors raises the unit cost of a product. Thus, the increase in the amount of the quantum dot phosphors is not economically preferable and it also increases the size of the product. Therefore, if it is possible to generate white light by using a smaller amount of quantum dot phosphors, the unit cost of the product and the size of the product may be reduced.

In order to generate the white light with a relatively smaller amount of quantum dot phosphors, the primary light should be fully scattered. When the primary light is scattered, a path length of the primary light may increase and accordingly the white light can be generated by a smaller number of quantum dot phosphors, which may result in improved efficiency of the quantum dot phosphor.

Scattering particles are required for scattering the primary light. However, conventionally known scattering particles scatter even the secondary light emitted from the quantum dot phosphors, as well as the primary light supplied from the light sources. The scattering particles known in the related art can increase the efficiency of the quantum dot phosphors to some degree by increasing a content of the scattering particles. However, when the content of the scattering particles exceeds a predetermined level, the scattering particles may interfere with the extraction of the secondary light, which ends up lowering the efficiency of the quantum dot phosphors.

SUMMARY OF THE INVENTION

Therefore, an aspect of the invention is to provide scattering particles that improve efficiency of quantum dot phosphors better than the related art. Another aspect of the detailed description is to provide a quantum dot composite which comprises the quantum dot phosphors and the scattering particles, and a backlight unit having the quantum dot composite. Another aspect of the detailed description is to provide a backlight unit, which employs a smaller amount of quantum dot phosphors than the related art, and a display device having the same.

To achieve these and other advantages and in accordance with the purpose of this specification, as embodied and broadly described herein, there is provided a backlight unit including a plurality of light sources that are configured to emit primary light, and a quantum dot composite, wherein the quantum dot composite may include quantum dot phosphors that are excited by the primary light supplied from the light sources so as to emit secondary light having a different wavelength than the primary light, and scattering particles that are configured to scatter the primary light. Here, the scattering particles may include first scattering particles, and second scattering particles that are different from the first scattering particles in size and composed of particles each having a diameter in the range of 5 to 50 nm. The present invention also provides a display unit with the backlight unit.

Further scope of applicability of the invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings.

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
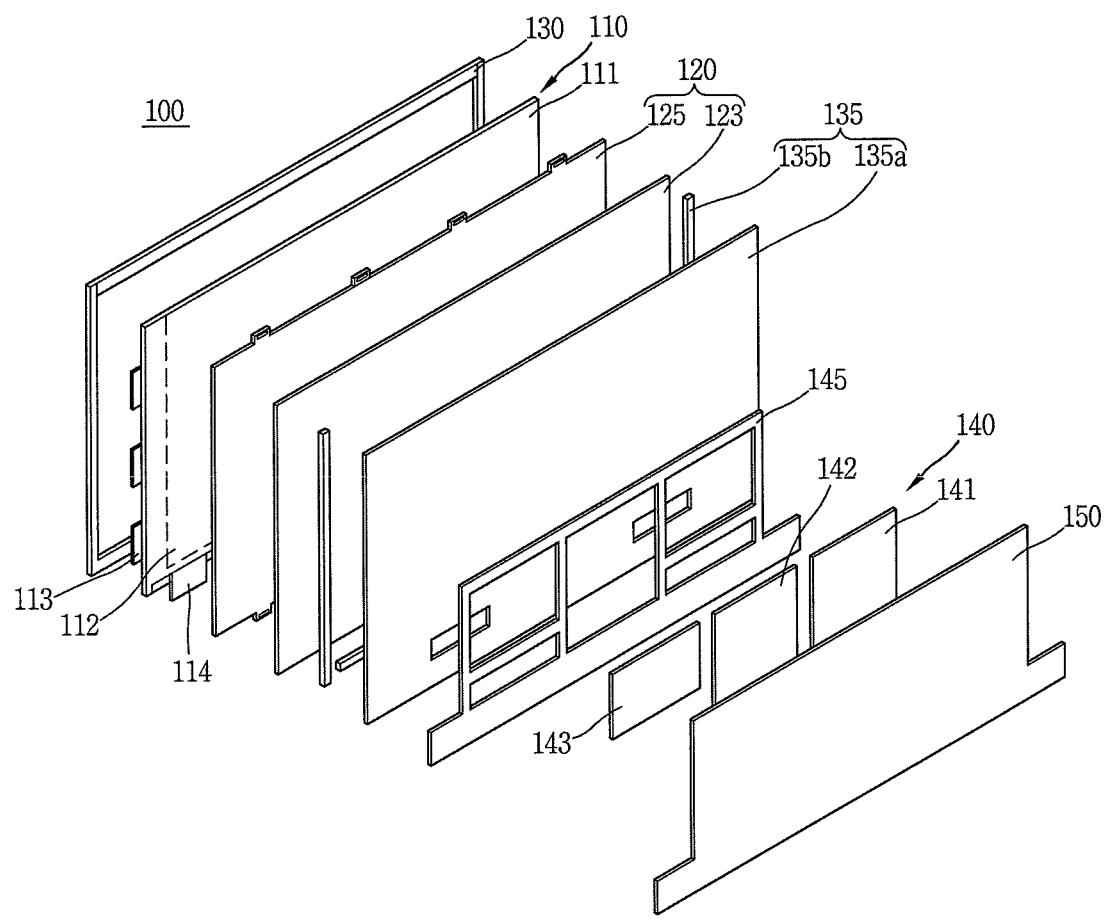
FIG. 1 is a conceptual view of a display device according to an embodiment of the invention.

FIG. 1 is a conceptual view of a display device 100 in accordance with the present invention. FIG. 1 illustrates that the display device 100 is applied to a television. However, with no limit to the television, the display device 100 may also be applicable to mobile terminals, such as smart phones, tablets, and the like, and monitors, etc.

As illustrated in FIG. 1, the display device 100 may include a liquid crystal panel 110, a backlight unit 120, a cover 130, a housing 135, a driving unit (or a driver) 140 and a rear case 150. The liquid crystal panel 110 corresponds to a portion on which an image is represented, and may be provided with a first substrate 111 and a second substrate 112 which are bonded to each other with interposing a liquid crystal layer therebetween. The first substrate 111 which is referred to as a thin film transistor (TFT) array substrate may be provided with a plurality of pixels which are defined by a plurality of scan lines and data lines intersecting with each other in a matrix configuration. A TFT which switches a signal on or off may be provided on each pixel, and a pixel electrode may be connected to the TFT on each pixel.

The second substrate 112 which is referred to as a color filter substrate may be provided with red (R), green (G) and blue (B) color filters which correspond to the plurality of pixels, respectively. The second substrate 112 may also be provided with a black matrix which surrounds each of the color filters and obscures non-display devices, such as the scan line, the data line and the TFT. Also, the second substrate 112 may be provided with a transparent common electrode, which covers the color filters and the black matrix.

A printed circuit board (PCB) may be connected to at least one side of the liquid crystal panel 110 through a connection member, such as a flexible printed circuit board (FPCB) or a tape carrier package (TCP). The printed circuit board may be closely adhered onto a rear surface of the housing 135 during a modularizing process.

On the liquid crystal panel 110 having such structure, when the TFT selected for each scan line is switched on by an ON/OFF signal of a gate driving circuit 113, transferred from the scan line, a data voltage of a data driving circuit 114 is transferred to the corresponding pixel electrode through the data line. Accordingly, an electric field is generated between the pixel electrode and the common electrode so as to change an alignment direction of liquid crystal molecules, thereby causing a difference of transmittance.

Meanwhile, the display device 100 disclosed herein may include the backlight unit 120 which is provided at a rear surface of the liquid crystal panel 110 and emits light toward the liquid crystal panel 110. The backlight unit 120 may be provided with an optical assembly 123, and a plurality of optical sheets 125 which are located on the optical assembly 123. At least one of the plurality of optical sheets 125 disclosed herein may be a film containing a quantum dot composite. Detailed description of the backlight unit 120 will be given later.

The liquid crystal panel 110 and the backlight unit 120 may be modularized through a cover 130 and the housing 135. The cover 130 located on a front surface of the liquid crystal panel 110 may be a top cover. The cover 130 has a shape of a rectangular frame which covers upper and side surfaces of the liquid crystal panel 110. The cover 130 may have a front opening to expose the image represented on the liquid crystal panel 110.

Also, the housing 135 located on the rear surface of the backlight unit 120 may be provided with a bottom plate 135a and supporting plates 135b. The bottom plate 135a may be a bottom cover. The bottom plate 135a may be in the shape of a rectangular plate, which is coupled to the liquid crystal panel 110 and the backlight unit 120 so as to serve as a support of the display device 100. The supporting plates 135b may allow the cover 130 and the bottom plate 135a to be coupled to each other and support the backlight unit 120.

The driving unit 140 may be disposed on one surface of the housing 135. The driving unit 140 may include a driving controller 141, a main board 142 and a power supply unit 143. The driving controller 141 may be a timing controller, and control an operating timing of each driving circuit of the liquid crystal panel 110. The main board 142 transfers a V-sync signal, an H-sync signal and R, G and B resolution signals to the timing controller. The power supply unit 143 supplies power to the liquid crystal panel 110 and the backlight unit 120.

The driving unit 140 may be provided on one surface of the housing 130, which is located at the rear of the backlight unit 120, by a driver chassis 145. The driving unit 140 may be covered by the rear case 150. Hereinafter, the thusly-configured backlight unit will be described in more detail.

Figure 2:
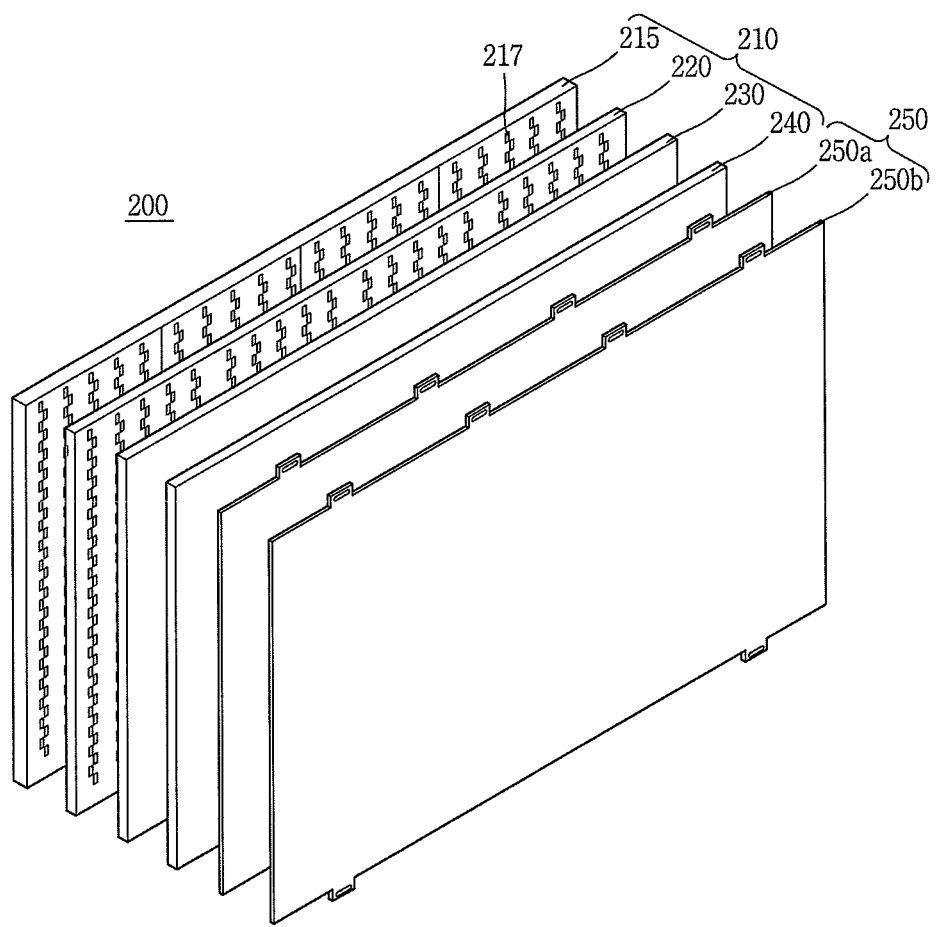
FIG. 2 is a disassembled perspective view of a backlight unit according to an embodiment of the invention.
Figure 3:
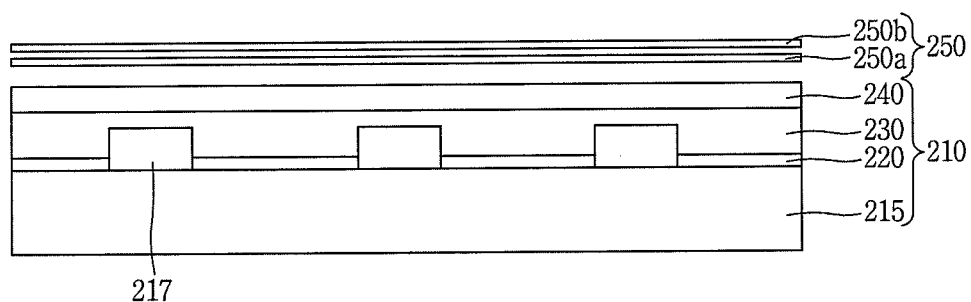
FIG. 3 is a lateral sectional view of the backlight unit.

FIG. 2 is a disassembled perspective view of a backlight unit 200 according to an embodiment of the invention, and FIG. 3 is a lateral view of the backlight unit 200 according to an embodiment of the invention. The optical assembly 210 may include a first layer 215, a plurality of light sources 217, a reflection layer 220, a second layer 230, and a diffusion plate 240. The plurality of light sources 217 are disposed on the first layer 215. The second layer 230 covers the plurality of light sources 217, and is located on the first layer 215.

The first layer 215 may be a substrate, on which the plurality of light sources 217 are mounted. The substrate may also be provided with an electrode pattern for connecting the light sources 217 to an adaptor for supplying power. For example, a carbon-nano tube electrode pattern for connecting the light sources 217 to the adaptor may be formed on an upper surface of the substrate.

The first layer 215 may be a printed circuit board (PCB) substrate, which may be made of polyethyleneterephthalate (PET), glass, polycarbonate (PC) or silicon (Si), and the like. The first layer 215 may be formed in a shape of a film.

The light source 217 may be one of a light-emitting diode (LED) chip or an LED package including at least one LED chip. This embodiment disclosed herein illustrates that the light source 217 is the LED package, but the light source 217 may not be limited to this.

The LED package constructing the light sources 217 may be divided into a top-view type and a side-view type according to a direction that a light-emitting surface faces. The light sources 217 according to one embodiment disclosed herein may be configured by using at least one of the top-view type LED package in which the light-emitting surface faces a top, and a side-view type LED package in which the light-emitting surface faces a side surface. When the light sources 217 are implemented as the side-view type LED package, the plurality of light sources 217 are disposed such that each light-emitting surface thereof faces the side surface, so as to emit light in a lateral direction, namely, a direction that the first layer 215 or the reflection layer 220 extends. This structure may reduce a thickness of the second layer 230 which is disposed on the light sources 217 so as to implement the slim backlight unit 200. This may result in realizing a slim display device.

Each of the light sources 217 may be configured as a colored LED which emits at least one of red, blue and green colors, or a white LED. Also, the colored LED may include at least one of a red LED, a blue LED and a green LED. Arrangements of those LEDs and light emitted therefrom may be modified and applied in various manners.

The second layer 230 is located on the first layer 215, and has a shape that covers the plurality of light sources 217. The second layer 230 may simultaneously transmit and diffuse light emitted from the light sources 217, such that the light emitted from the light sources 217 can be uniformly provided to the liquid crystal panel 110.

The reflection layer 220 which reflects the light emitted from the light sources 217 may be located on the first layer 215. The reflection layer 220 may be formed on a region excluding a region where the light sources 217 are formed on the first layer 215. The reflection layer 220 may reflect the light emitted from the light sources 217 and re-reflect light which has been totally reflected from a boundary of the second layer 230, such that the light can be more widely spread.

The reflection layer 220 may contain at least one of a metal or a metallic oxide, which is a reflecting material. For example, the reflection layer 220 may contain a metal or a metallic oxide having high reflectivity, such as aluminum (Al), argentums (Ag), gold (Aurum, Au) or titanium dioxide ($TiO_2$).

Here, the reflection layer 220 may be formed by depositing or coating the metal or metallic oxide on the first layer 215, or by printing a metallic ink on the first layer 215. Here, the deposition may be implemented by thermal deposition, evaporation or vacuum deposition, such as sputtering. The coating or printing method may be implemented by printing, gravure coating or silk-screening.

Meanwhile, the second layer 230 located on the first layer 215 may be made of a light-transmissive material, for example, silicon or acryl-based resin. However, the second layer 230 may also be made of various types of resin, without being limited to those materials.

In order for the backlight unit 200 to have uniform brightness by diffusion of the light emitted from the light sources 217, the second layer 230 may be made of resin having a refractive index of about 1.4 to 1.6. For example, the second layer 230 may be made from polyethyleneterephthalate (PET), polycarbonate (PC), polypropylene (PP), polyethylene (PE), polystyrene (PS), polyepoxy (PE), silicon, acryl, and the like.

The second layer 230 may include polymer resin having an adhesive property to be firmly adhered onto the light sources 217 and the reflection layer 220. For example, the second layer 230 may consist of acryl-based, urethane-based, epoxy-based and melamine-based polymer resin, such as, unsaturated polyester, methylmethacrylate, ethylmethacrylate, isobutyl methacrylate, normal butyl methacrylate, normal butyl methylmethacrylate, acrylic acid, methacryllic acid, hydroxyl ethyl methacrylate, hydroxyl propyl methacrylate, hydroxyl ethyl acrylate, acrylamide, methylol acrylamide, glycidyl methacrylate, ethyl acrylate, isobutyl acrylate, normal butyl acrylate, and 2-ethyl hexyl acrylate polymer, copolymer or terpolymer, and the like. The second layer 230 may be formed by coating resin in a liquid or gel phase on the first layer 215 with the plurality of light sources 217 and the reflection layer 220 and curing the coated resin, or by coating resin on a supporting sheet and partially curing the resin to be closely adhered onto the first layer 215.

The diffusion plate 240 by which the light emitted from the light sources 217 is diffused upward may be provided on the second layer 230. The diffusion plate 240 may be bonded onto the second layer 230, or adhered using an additional adhesive member. The optical sheet 250 may be located on the optical assembly 210, and at least one of the optical sheets 250a and 250b (250) may be a film containing a quantum dot composite.

Figure 4:
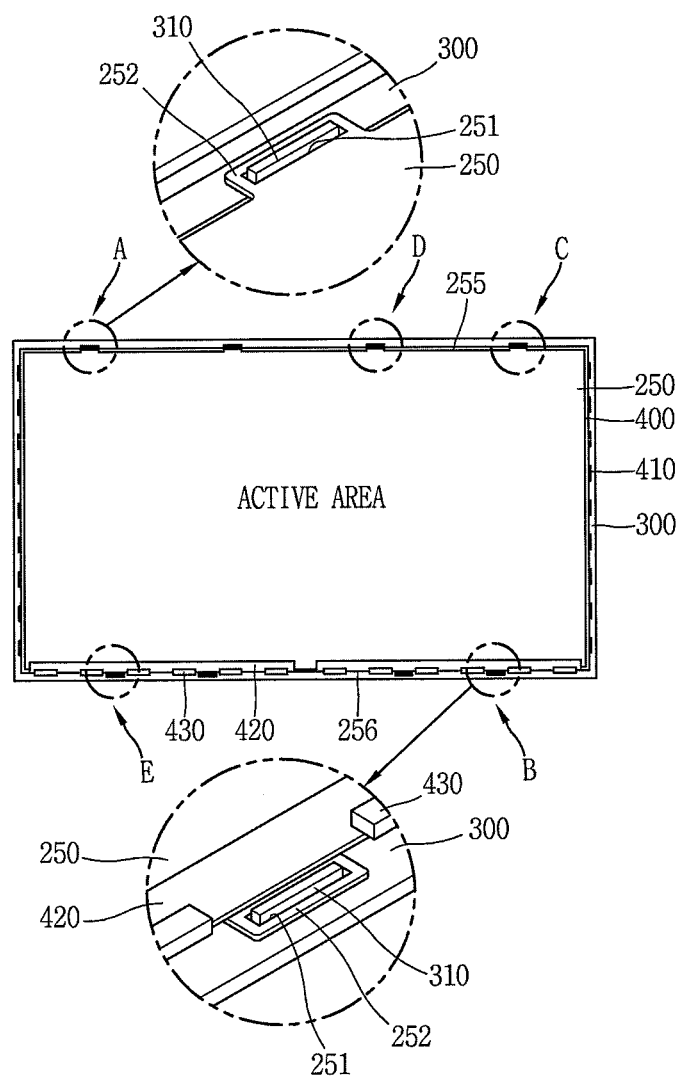
FIG. 4 is a conceptual view illustrating a liquid crystal panel and an optical sheet coupled to a housing according to an embodiment of the invention.

FIG. 4 is a conceptual view illustrating a liquid crystal panel 400 and an optical sheet 250 coupled to a housing. As illustrated in FIG. 4, a liquid crystal panel 400 may be located on a cover 300, and an optical sheet 250 may be located on the liquid crystal panel 400. A plurality of gate driving circuits 410 may be disposed at left and right sides of the liquid crystal panel 400. A printed circuit board 420 may be disposed beneath the liquid crystal panel 400 and extend up along the liquid crystal panel 400 to cover the optical sheet 250. A plurality of data driving circuits 430 may be disposed on the printed circuit board 420.

Here, the optical sheet 250 disposed on the cover 300 may be coupled to fixing portions 310 of the cover 300. The fixing portions 310 of the cover 300 may be inserted into holes 251 of the optical sheet 250.

In more detail, referring to region A of FIG. 4, the fixing portion 310 formed on an upper side wall of the cover 300 may be inserted into the hole 251 formed on a protruding portion 252 of the optical sheet 250. That is, the fixing portion 310 of the cover 300 may be coupled to the hole 251 of the optical sheet 250.

Referring to region B of FIG. 4, the fixing portion 310 formed on a lower side wall of the cover 300 may be inserted into the hole 251 formed on the protruding portion 252 of the optical sheet 250. Here, the protruding portion 252 of the optical sheet 250 and the fixing portion 310 of the cover 300 may be located between the data driving circuits 430 of the liquid crystal panel 400.

That is, to ensure a region on which the data driving circuits 430 are mounted on a side surface of the cover 300, the fixing portion 310 may be located between the data driving circuits 430, and the protruding portion 252 and the hole 251 of the optical sheet 250 may also be located between the data driving circuits 430 according to the arrangement of the fixing portion 310.

Figure 5:
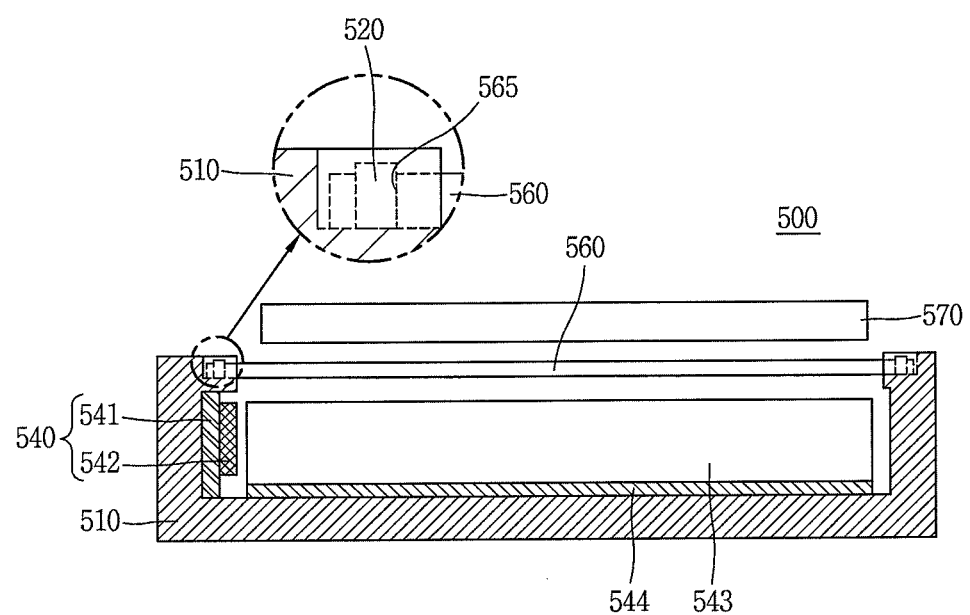
FIG. 5 is a conceptual view illustrating an edge type display device according to an embodiment of the invention.

Hereinafter, a display device which is classified into an edge type device will be described. FIG. 5 is a conceptual view of an edge type display device 500.

As illustrated in FIG. 5, the display device 500 may include a bottom plate 510, an optical assembly 540, an optical sheet 560 and a liquid crystal panel 570. The bottom plate 510 serves to accommodate the optical assembly 540 and the optical sheet 560, and may thus be a bottom plate of a housing.

The optical assembly 540 accommodated in the bottom plate 510 may include a first layer 541 and a plurality of light sources 542. The first layer 541 may be a substrate on which the plurality of light sources 542 are mounted. The first layer 541 is provided with an electrode pattern for connecting the light sources 542 to an adaptor supplying power.

The first layer 541 may be a PCB substrate, which is made of polyethyleneterephthalate (PET), glass, polycarbonate (PC), silicon (Si), and the like. The first layer 541 may be formed in a shape of a film.

Each of the light sources 542 may be one of a light-emitting diode (LED) chip or an LED package including at least one LED chip. This embodiment disclosed herein illustrates that the light sources 217 are the LED package.

The LED package constructing the light sources 542 may be divided into a top-view type and a side-view type according to a direction that a light-emitting surface faces. The light sources 542 according to one embodiment disclosed herein may be configured by using at least one of the top-view type LED package in which the light-emitting surface faces a top, and a side-view type LED package in which the light-emitting surface faces a side surface.

A light guide panel 543 may be disposed in a direction that the light sources 542 emit light, and serve to widely spread the incident light from the light sources 542. A reflection plate 544 may be disposed beneath the light guide panel 543, and serve to reflect light up, which has been reflected down by the light guide panel 543.

In such a manner, the optical assembly 540 which includes the first layer 541 and the light sources 542 is located on the side surface of the bottom plate 510, so as to operate as a backlight unit which emits light according to an edge light emitting method. This method is distinguished from the direct-type light emitting method illustrated in FIG. 3.

The optical sheet 560 may be located on the light guide panel 543. The optical sheet 560 may be a diffusion sheet which diffuses light or a prism sheet which collects light, and may be provided in plurality.

The optical sheet 560 may be mounted on the light guide panel 543, and coupled to a fixing portion 520 formed on a side wall of the bottom plate 510. Here, the optical sheet 560 may include a plurality of holes 565. The bottom plate 510 may include the fixing portion 520 in plurality.

Accordingly, the optical sheet 560 may be fixed to the bottom plate 510 in a manner that the hole 565 of the optical sheet 560 is coupled with the fixing portion 520 formed on the side wall of the bottom plate 510.

This structure prevents the optical sheet 560 from being deformed due to contraction or expansion caused by heat generated from the light sources 542 of the optical assembly 540. This may provide an advantage of improving optical uniformity of the backlight unit.

Hereinafter, a mobile terminal having a display module will be described. The mobile terminal corresponds to one example of a display device for outputting visual information. The display module may perform a function of outputting the visual information on the mobile terminal.

Mobile terminals presented herein may be implemented using a variety of different types of terminals Examples of such terminals include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

Figure 6:
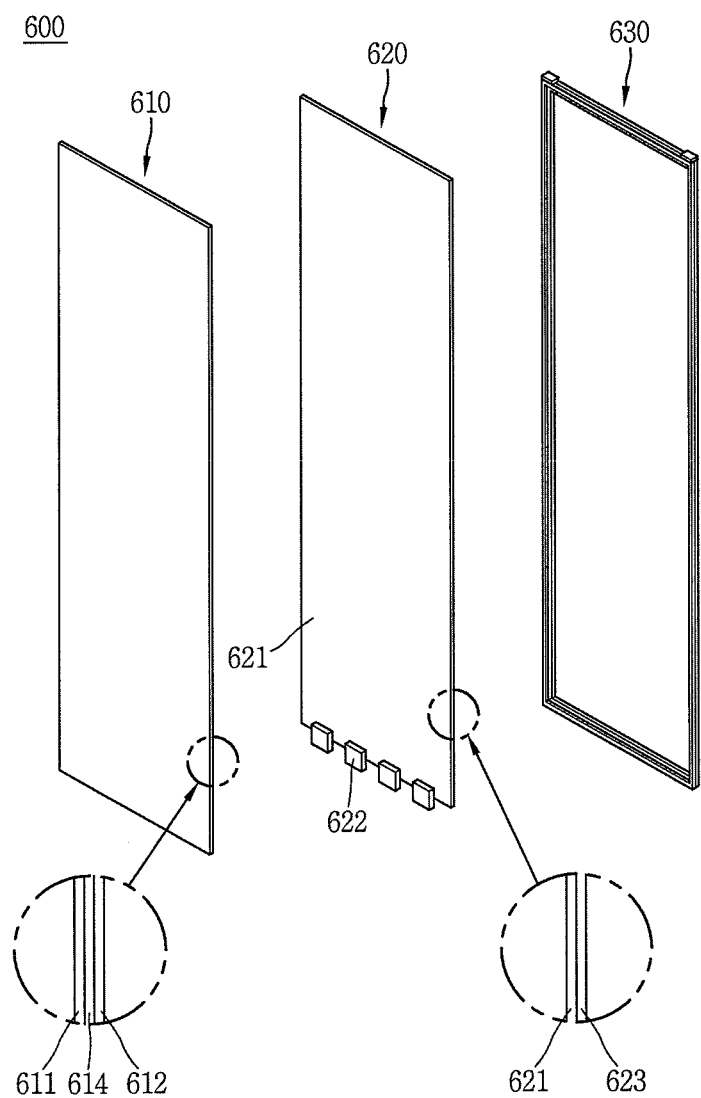
FIG. 6 is a disassembled perspective view illustrating a display module of a mobile terminal according to an embodiment of the invention.

FIG. 6 is a disassembled perspective view illustrating a display module 600 of a mobile terminal in accordance with the present invention. As illustrated in the disassembled perspective view of FIG. 6, the display module 600 may include a liquid crystal panel 610, a backlight unit 620, and a mold 630.

The liquid crystal panel 610 outputs a desired color for each pixel by applying a signal to a transistor to induce a phase change in liquid crystals. The liquid crystal panel 610 includes two transparent substrates 611 and 612, and a liquid crystal layer 614 interposed between the two substrates 611 and 612. A transparent upper electrode is provided on the upper substrate 611, and a transparent lower electrode is provided on the lower substrate 612.

The upper substrate 611 includes color filters for representing colors, and thus is also referred to a color filter layer. Light supplied from the backlight unit 620 located at a rear side of the upper substrate 611 is selectively transmitted by changing arrangements of liquid crystals by controlling voltages of the upper electrode and the lower electrode.

The backlight unit 620 is located at the rear side of the liquid crystal panel 610, and uniformly supplies light toward the liquid crystal panel 610. The backlight unit 620 roughly includes a light guide panel 621, and light sources 622 supplying light to the light guide panel 621.

The light guide panel 621 may be made of a transparent material, and an example thereof may be a transparent acryl panel. Various patterns may be formed on the light guide panel 621 to evenly supply the light emitted from the light sources 622 onto an entire surface of the liquid crystal panel 610. A prism film or a reflection film 623 may be attached onto the surface of the light guide panel 621.

The light sources 622 supply light to the light guide panel 621. FIG. 6 exemplarily illustrates LED-type light sources 622, but the type of the light source 622 may be variously implemented. Also, the position of the light sources 622 may be varied without being limited to a side surface of the light guide panel 621 as illustrated in FIG. 6. The mold 630 is coupled to peripheries of liquid crystal panel 610 and the backlight unit 620, so as to cover the side surfaces of the backlight unit 620.

Figure 7:
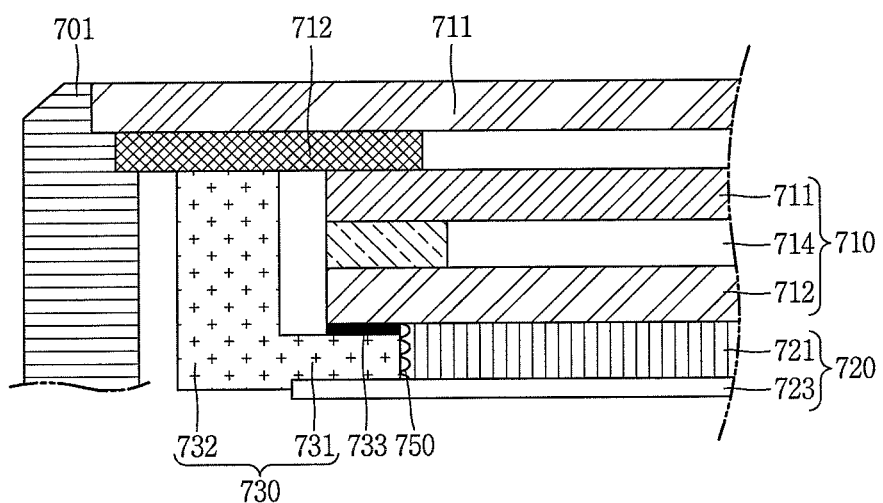
FIG. 7 is a lateral sectional view of the display module of the mobile terminal.

FIG. 7 is a lateral view illustrating a display module 700 of a mobile terminal in accordance with the present invention. The display module 700 is located on a region defined by a front case 701. A backlight unit 720 is disposed on a region defined by a mold 730.

The mold 730 includes a panel supporting portion 731, and a side wall portion 732 extending from the panel supporting portion 731 toward a front surface of the display module 700 to cover a side surface of a liquid crystal panel 710. Alternatively, the mold 730 may also be provided with only the panel supporting portion 731 having an upper surface coupled to a circumference of a lower surface of the liquid crystal panel 710.

The panel supporting portion 731 of the mold 730 surrounds the backlight unit 720. An upper surface of the mod 730 comes in contact with the circumference of the lower surface of the liquid crystal panel 710, thereby fixing the backlight unit 720 and the liquid crystal panel 710.

When the upper surface of the panel supporting portion 731 and the liquid crystal panel 710 are coupled to each other using an adhesive pad or an adhesive 733 with a dark color, a leakage of light through the coupled portion therebetween can be prevented.

The mold 730, as aforementioned, may further include the side wall portion 732 extending from the panel supporting portion 731. The side wall portion 732 covers side surfaces of the liquid crystal panel 710. The side wall portion 732 serves to protect the side surfaces of the liquid crystal panel 710 and the backlight unit 720 and support a front glass 711.

Since the mold 730 covers the side surfaces of the backlight unit 720, light can be emitted from the side surfaces of the backlight unit 720 through the side surfaces of the panel supporting portion 731. When the mold 730 used has a bright color, light may be reflected along the side wall portion 732 of the mold 730 to be incident onto the side surfaces of the liquid crystal panel 710. In such a manner, light which is incident through an abnormal path, other than a normal path of being incident from the rear surface of the liquid crystal panel 710, may cause a problem of such light leakage. In order to prevent the light leakage, light should be prevented from being incident onto the mold 730 or the light incident onto the mold 730 should be blocked such that it cannot be incident onto the liquid crystal panel 710.

Alternatively, the mold 730 may be provided with only the panel supporting portion 731, except for the side wall portion 732. In this structure, light incident onto the mold 730 may not be incident onto the side surfaces of the liquid crystal panel 710. This configuration may eliminate the structure causing the light leakage, so as to block the light incident onto the side surfaces of the liquid crystal panel 710.

Here, without the side wall portion for covering the side surfaces of the liquid crystal panel 710, it is difficult to disperse a force applied to the liquid crystal panel 710. Accordingly, the liquid crystal panel 710 may be likely to be damaged due to an external impact. To prevent this, a case protruding portion may further be provided on side surfaces of a case 701. When the case protruding portion is located between the upper surface of the mold 730 and the front glass 711, the case protruding portion may be responsible for a function of protecting the liquid crystal panel 710, which was performed by the side wall portion 732 of the mold 730. There is a boundary between the case protruding portion and the mold 730, so as to block a path of light primarily incident onto the mold 730. The case protruding portion is formed integrally with the case 701, and thus any surface for reflecting light back toward the liquid crystal panel 710 may not be present. Therefore, the case protruding portion may prevent the light from being incident onto the side surfaces of the liquid crystal panel 710.

Figure 8:
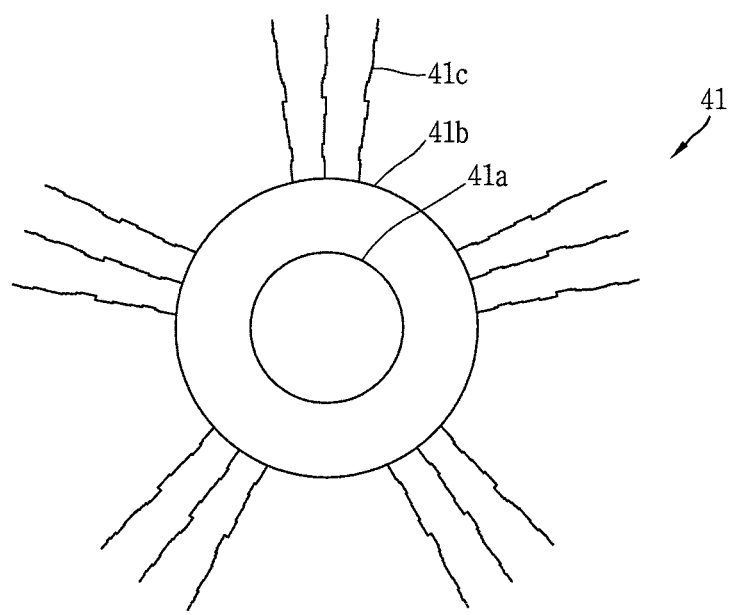
FIG. 8 is a conceptual view of quantum dots according to an embodiment of the invention.

Hereinafter, description will be given of quantum dot phosphors in accordance with embodiments of the present invention, followed by a quantum dot composite using the quantum dot phosphors. FIG. 8 is a conceptual view of a quantum dot 41 in accordance with an embodiment the present invention. The quantum dot 41 is composed of a nano-sized core 41a made of an inorganic material, and an organic ligand 41c stabilizing the core 41a. Various quantum dots 41, such as II-VI, III-V, IV-VI, I-III-V and the like, have been reported. For example, the quantum dot 41 may be made of one selected from a group including Cds, CdSe, CdTe, ZnS, ZnSe, ZnTe, HgS, HgSe, HgTe, GaN, GaP, GaAs, GaSb, AlN, AlP, AlAs, AlSb, InN, InP, InAs, InSb, Si, Ge and a compound thereof.

In general, the core 41a is extremely unstable due to its very great surface area and very high volume ratio. Also, traps for preventing various types of optical coupling are present on the unstable surface of the core 41a. The unstable surface and traps affect light generation and causes an emission of non-fluorescent energy, thereby absolutely lowering quantum efficiency. A reported method for preventing the lowering of the quantum efficiency is to stabilize the quantum dot 41 by surrounding the core 41a using a shell 41b made of an inorganic material.

Quantum dot phosphor refers to using the quantum dot as phosphor. The quantum dot phosphors are excited by primary light supplied from light sources so as to emit secondary light having a different wavelength from the primary light. For example, the quantum dot phosphors are excited by blue primary light supplied from light sources so as to emit green or red secondary light.

Here, the primary light and the secondary light may be classified before and after being absorbed by the quantum dot phosphors. Light, such as light supplied from the light source, which excites the quantum dot phosphor, is classified into the primary light, and light emitted from the quantum dot phosphor is classified into the secondary light.

Fluorescence of the quantum dots 41 is due to light which is generated by electrons in a floating state from a conduction band down to a valence band. The quantum dot phosphor has a full width at half maximum (FWHM, a width at a position with a half of a maximum value in a relative spectral distribution), which is narrower than that of the conventional phosphor, so as to be advantageous in high color reproduction.

The quantum dot phosphors are excited by blue primary light and emit green or red secondary light. Hence, when the primary light and the secondary light are combined (mixed) with each other, white light can be generated.

Figure 9:
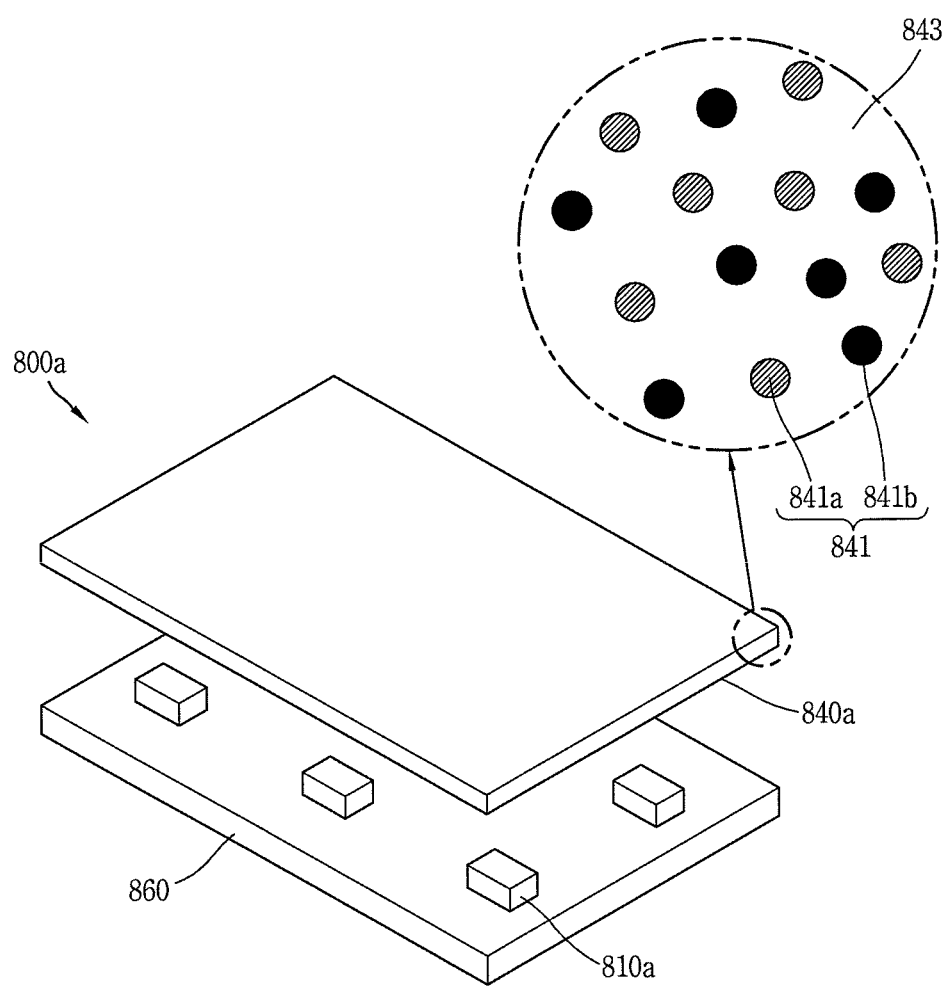
FIG. 9 is a conceptual view illustrating a quantum dot composite and a backlight unit having the same according to an embodiment of the invention.

Hereinafter, description will be given of a quantum dot composite using the quantum dots 41 as phosphors and a backlight unit having the quantum dot composite. FIG. 9 is a conceptual view illustrating a quantum dot composite 840a and a backlight unit 800a having the same.

FIG. 9 exemplarily illustrates a direct-type backlight unit 800a. However, the backlight unit 800a disclosed herein may not be limited to the direct type. The backlight unit 800a includes light sources and a quantum dot composite 840a.

The light sources are configured to supply primary light. As aforementioned, the light sources may include LEDs 810a which emit light by receiving an applied current. The LEDs 810a may be disposed on one surface of a printed circuit board 860. A reflection plate may be disposed on one surface of the printed circuit board 860, and the LEDs 810a may be located on the reflection plate. The reflection plate reflects lost light, which has failed to go toward the quantum dot composite 840a, back to the quantum dot composite 840a. The LEDs 810a illustrated in FIG. 9 are configured to emit blue primary light.

The quantum dot composite 840a is a constituting element containing quantum dot phosphors 841 in a matrix 843. The quantum dot composite 840a is configured to emit three primary light using the primary light supplied from the LEDs 810a. The quantum dot phosphors 841 are excited by the primary light emitted from the LEDs 810a so as to emit secondary light having a different wavelength than the primary light.

Figure 10:
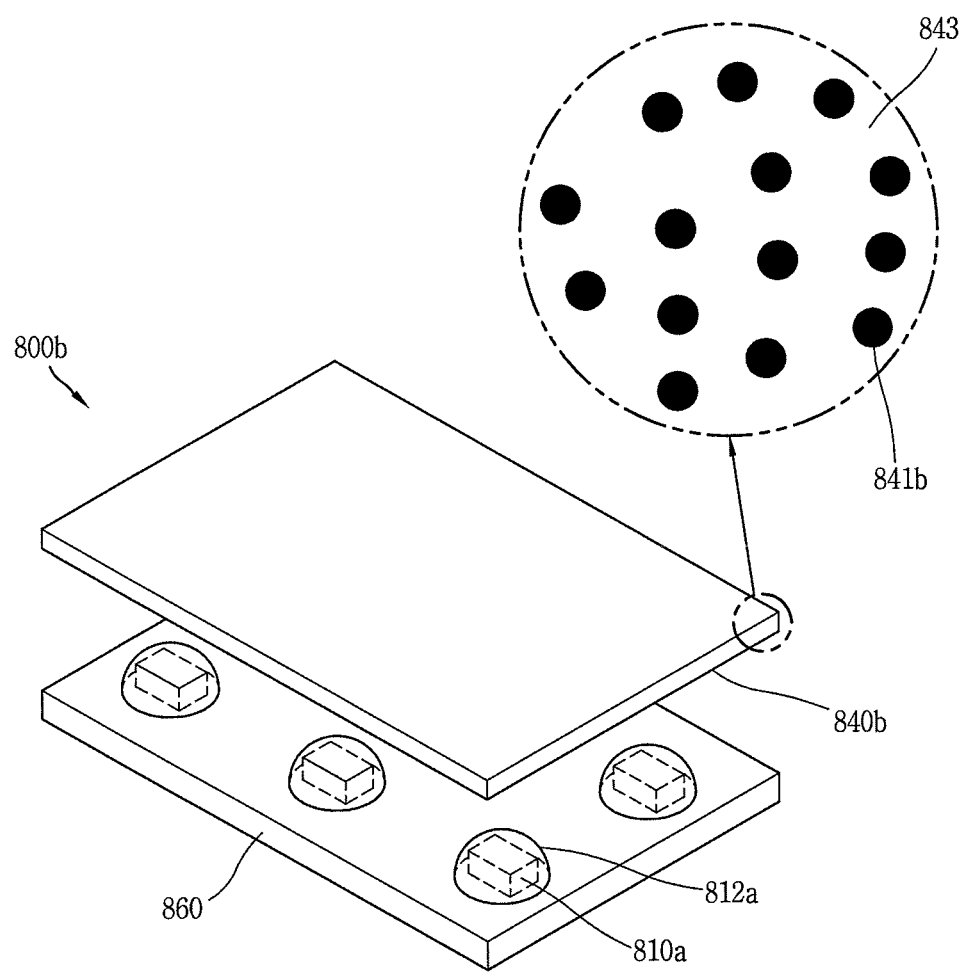
FIG. 10 is a conceptual view illustrating a variation of a quantum dot composite and a backlight unit having the same according to an embodiment of the invention.
Figure 11:
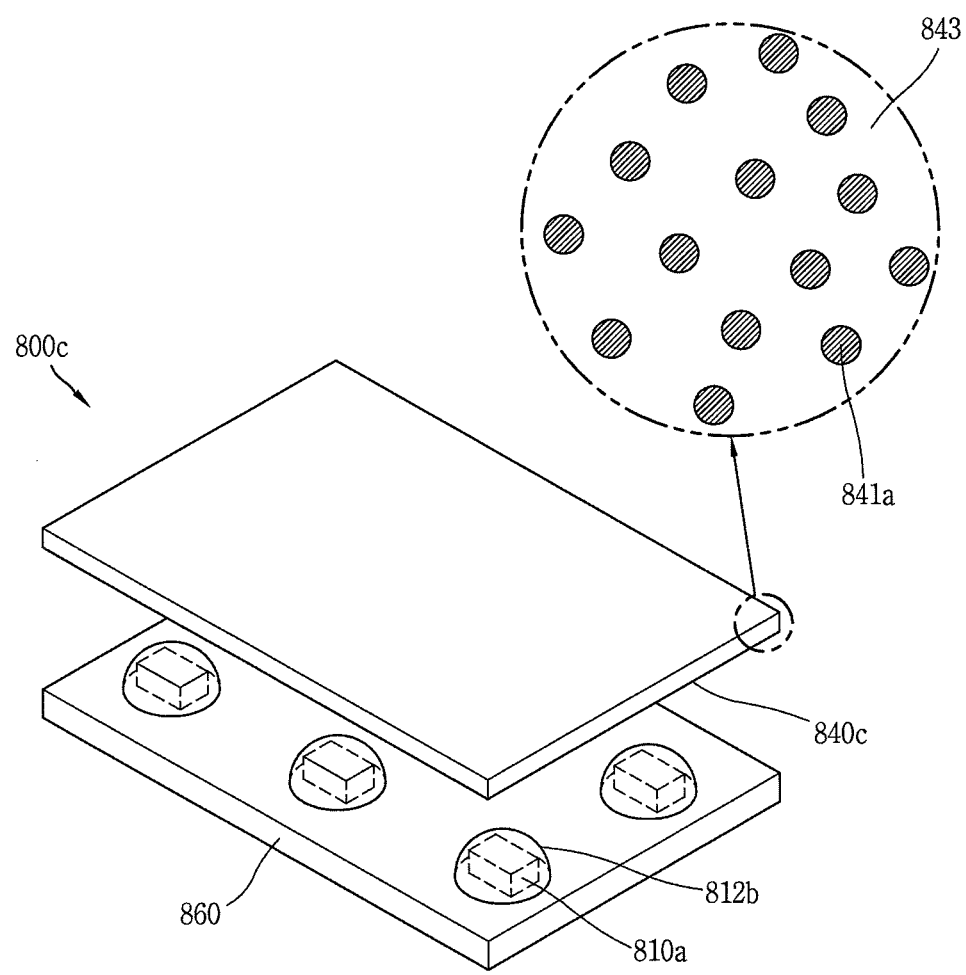
FIG. 11 is a conceptual view illustrating another variation of a quantum dot composite and a backlight unit having the same according to an embodiment of the invention.

The configuration of the quantum dot phosphors 841 may vary depending on the light source and inorganic phosphors (see FIGS. 10 and 11). When the LEDs 810a emit the blue primary light as illustrated in FIG. 9, the quantum dot composite 840a includes green light-emitting quantum dot phosphors 841a, and red light-emitting quantum dot phosphors 841b. The green light-emitting quantum dot phosphors 841a are excited by the blue primary light emitted from the LED 810a, so as to emit green secondary light. The red light-emitting quantum dot phosphors 841b are excited by the blue primary light emitted by the LED 810a, so as to emit red secondary light. Accordingly, the backlight unit 800a may emit three primary lights including the blue primary light, the green secondary light and the red secondary light.

The quantum dot composite 840a may be formed in a shape of a film, as illustrated in FIG. 9. The film-like quantum dot composite 840a is disposed to be spaced apart from the LEDs 810a so as to create a remote phosphor structure. The remote phosphor is a constituting element that a light source and phosphor are separated from each other, and refers to the light source and the phosphor being spaced from each other. The quantum dot composite 840a in the direct-type backlight unit 800a may be disposed to face the LEDs 810a, and receive the blue primary light directly from the LEDs 810a.

FIG. 10 is a conceptual view illustrating a variation of a quantum dot composite 840b and a backlight unit 800b having the same. Light sources include LEDs 810a emitting blue primary light. The backlight unit 800b includes green light-emitting inorganic phosphors 812a. The green light-emitting inorganic phosphors 812a are encapsulated on (or encapsulates) the corresponding LED 810a to emit green primary light using the blue primary light supplied from the LED 810a.

The backlight unit 800b should emit three primary lights. Blue light of the three primary lights is emitted from the LEDs 810a, and green light is emitted from the green light-emitting inorganic phosphors 812a. Therefore, red light is additionally required.

As aforementioned, the types of the quantum dot phosphors may vary depending on the light sources and the inorganic phosphors 812a. What is required for the three primary lights in the quantum dot composite 840b illustrated in FIG. 10 is the red light-emitting quantum dot phosphors 841b.

Referring to FIG. 10, the quantum dot composite 840b includes the red light-emitting quantum dot phosphors 841b. The red light-emitting quantum dot phosphors 841b are excited by the blue primary light emitted from the light sources or the green primary light emitted from the green light-emitting inorganic phosphors 812a, thereby emitting red secondary light.

The backlight unit 800b emits the three primary lights including the blue primary light, the green primary light and the red secondary light. Description of the other configuration will be understood with reference to FIG. 9.

FIG. 11 is a conceptual view illustrating a variation of a quantum dot composite 840c and a backlight unit 800c having the same. Light sources include LEDs 810a emitting blue primary light. The backlight unit 800c includes red light-emitting inorganic phosphors 812b. The red light-emitting inorganic phosphors 812b are encapsulated on (or encapsulates) the corresponding LED 810a to emit red primary light using the blue primary light emitted from the LED 810a.

The backlight unit 800c should emit three primary lights. Blue light of the three primary lights is emitted from the LED 810a, and red light is emitted from the red light-emitting inorganic phosphors 812b. Therefore, green light is additionally required.

As aforementioned, the types of the quantum dot phosphors may vary depending on the light sources and the inorganic phosphors 812b. What is required for the three primary lights in the quantum dot composite 840c illustrated in FIG. 11 is the green light-emitting quantum dot phosphors 841a.

Referring to FIG. 11, the quantum dot composite 840c includes the green light-emitting quantum dot phosphors 841a. The green light-emitting quantum dot phosphors 841a are excited by the blue primary light emitted from the light sources, thereby emitting green secondary light. The quantum dot phosphors absorb light with wavelengths that are shorter than the light emitted from the quantum dot phosphors. Therefore, the green light-emitting quantum dot phosphors 841a are unable to absorb red primary light.

The backlight unit 800c thus emits the three primary lights including the blue primary light, the red primary light and the green secondary light. Description of the other configuration will be understood with reference to FIG. 9.

The quantum dot composite disclosed herein may be applicable, irrespective of a type of light source or a type of quantum dot phosphor. Therefore, the quantum dot composite disclosed herein may be applied to all of the backlight units 800a, 800b and 800c illustrated in FIGS. 9 to 11. Specifically, lighting apparatuses may employ various types of quantum dot phosphors for ensuring color rendering. The present invention may also be applicable to a case of employing various types of quantum dot phosphors.

Hereinafter, for the sake of explanation, it is assumed that primary light is blue light, and secondary light is green and red light. However, the description under this assumption should not be construed to limit the scope of the present invention.

Figure 12:
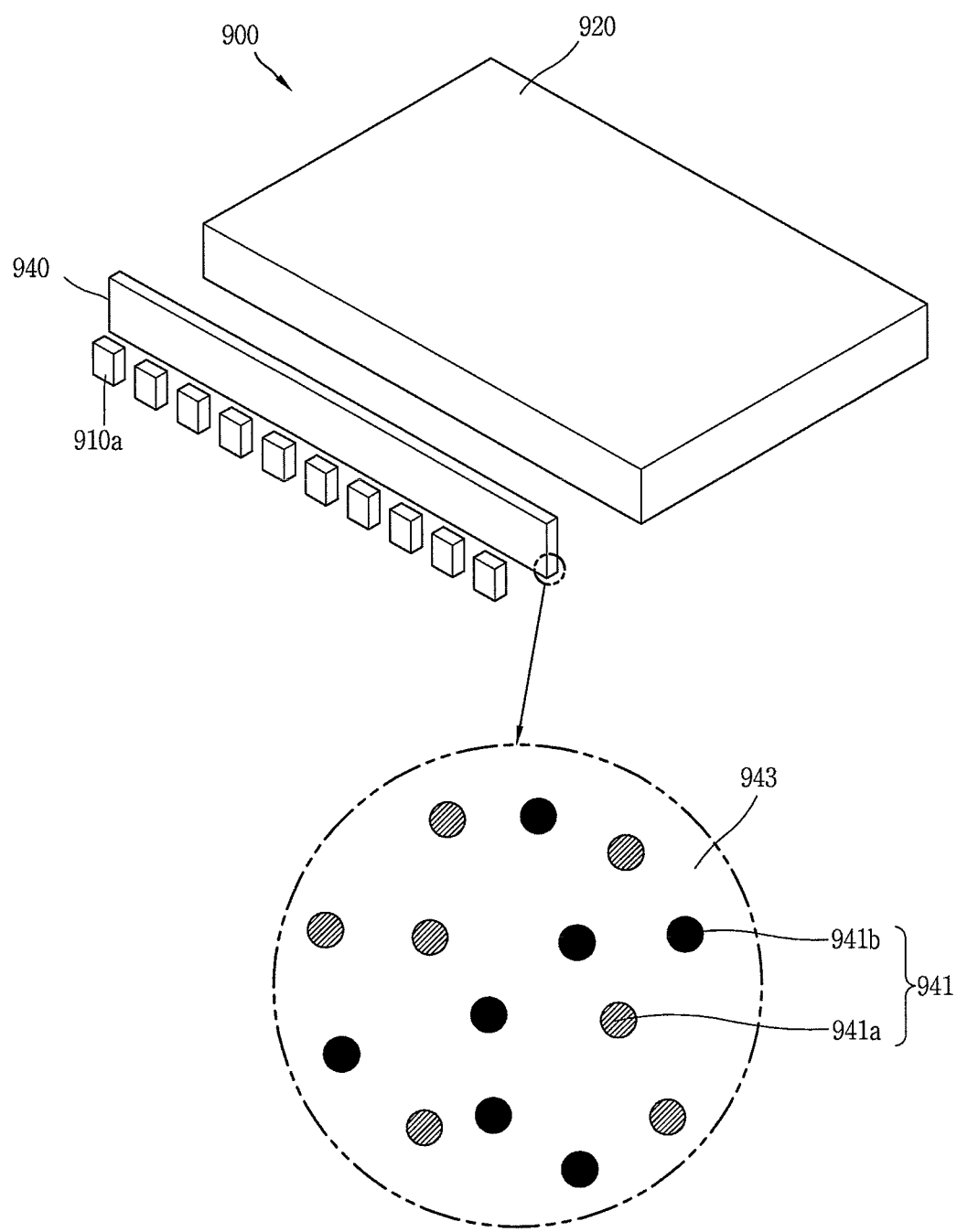
FIG. 12 is another conceptual view illustrating a quantum dot composite and a backlight unit having the same according to an embodiment of the invention.

FIG. 12 is a conceptual view illustrating another embodiment of a quantum dot composite 940 and a backlight unit 900 having the same. FIG. 12 exemplarily illustrates an edge-type backlight unit 900 in which light sources are arranged along an edge of a light guide panel 920. However, the backlight unit 900 according to an embodiment of the present invention may not be limited to the edge type.

The backlight unit 900 includes light sources, a quantum dot composite 940, and a light guide panel 920. The light sources are configured to supply primary light. The light sources may also include LEDs 910a emitting blue primary light.

The quantum dot composite 940, as illustrated in FIG. 12, may be formed in a shape of a tube. The tube-like quantum dot composite 940 may be disposed spaced apart from the LEDs 910a so as to create a remote phosphor structure. The quantum dot composite 940 is disposed to face the LEDs 910a, and receive the primary light directly from the LEDs 910a.

The quantum dot composite 940 is disposed between the LEDs 910a and the light guide panel 920. The light guide panel 920 and the LEDs 910a are located to face each other with interposing the quantum dot composite 940 therebetween. Three primary lights emitted from the tube-like quantum dot composite 940 may be guided by the light guide panel 920 so as to go toward a liquid crystal panel.

The quantum dot composite 940 is configured to emit three primary lights by using the primary light supplied from the LEDs 910a. The quantum dot composite 940 includes quantum dot phosphors 941. The quantum dot phosphors 941 are excited by the primary light emitted from the LED 910a so as to emit secondary light having a different wavelength from the primary light. The variation in the types of the quantum dot phosphors 941 depends on the light sources and the inorganic phosphors will be understood with reference to FIGS. 9 to 11.

The LEDs 910a emit blue primary light. The quantum dot composite 940 includes green light-emitting quantum dot phosphors 941a and red light-emitting quantum dot phosphors 941b in a matrix 943. The green light-emitting quantum dot phosphors 941a are excited by the primary light so as to emit green secondary light. The red light-emitting quantum dot phosphors 941b are excited by the primary light so as to emit red secondary light. The backlight unit 900 thus emits three primary lights including the blue primary light, the green secondary light and the red secondary light.

Figure 13:
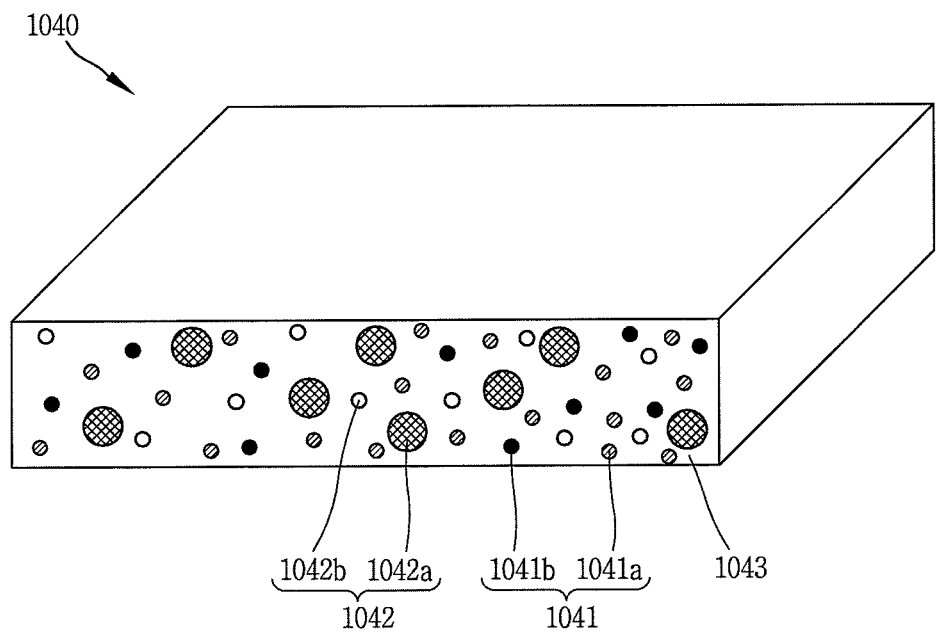
FIG. 13 is a conceptual view of a quantum dot composite according to an embodiment of the invention.

FIG. 13 is a conceptual view of a quantum dot composite 1040 in accordance with an embodiment of the present invention. The quantum dot composite 1040 includes quantum dot phosphors 1041, a matrix 1043 and scattering particles 1042.

The quantum dot phosphors 1041, as aforementioned, are excited by primary light supplied from light sources to emit secondary light having a different wavelength from the primary light. The quantum dot phosphors 1041 illustrated in FIG. 13 include green light-emitting quantum dot phosphors 1041a and red light-emitting quantum dot phosphors 1041a. Accordingly, it can be presumed that the light sources are provided merely with LEDs emitting blue primary light.

The matrix 1043 supports the quantum dot phosphors 1041 and the scattering particles 1042. The matrix 1043 may be formed by curing resin. The quantum dot phosphors 1041 and the scattering particles 1042 are dispersed within the matrix 1043. The quantum dot composite 1040 and the matrix 1043 may be formed in a shape of a film or a tube.

Efficiency of the quantum dot composite 1040 is associated directly with unit cost, performance and size of a product. Only the use of the quantum dot composite 1040 with high efficiency may result in the reduced unit cost of the product, and realization of a slimmer backlight unit. The quantum dot composite 1040 having the high efficiency refers to sufficiently emitting three primary lights by using a smaller number of quantum dot phosphors 1041.

Therefore, in order to emit three primary lights by using a relatively smaller number of quantum dot phosphors 1041, the primary light has to be fully scattered. Embodiments of the present invention employ the scattering particles 1042 for scattering the primary light. The scattering particles 1042 scatter the primary light, so as to increase an amount of light converted from the primary light into secondary light by the quantum dot phosphors 1041.

The scattering particles 1042 improve the efficiency of the quantum dot composite 1040 through the scattering of the primary light. Also, the scattering particles 1042 may prevent the secondary light emitted from the quantum dot phosphors 1041 from being re-absorbed by other quantum dot phosphors 1041, and improve secondary light extraction efficiency. Accordingly, the employment of the scattering particles 1042 may result in an enhancement of the efficiency of the quantum dot composite 1040.

However, the related art scattering particles have a problem of scattering even secondary light emitted from quantum dot phosphors as well as primary light emitted from light sources. This results from the fact that micro-sized scattering particles used in the related art scatter most types of light, irrespective of wavelength. When a content of scattering particles within the quantum dot composite increases, the efficiency of the quantum dot phosphors can be enhanced. However, when the content of scattering particles exceeds a predetermined level, the scattering particles interfere with the emission of secondary light, so as to lower the efficiency of the quantum dot phosphors.

To overcome this problem in the related art, the scattering particles 1042 disclosed herein include first scattering particles 1042a and second scattering particles 1042b. The first scattering particles 1042a are formed in a micro-size and the second scattering particles 1042b are formed in a nano-size. Referring to FIG. 13, it can be noticed that the first scattering particles 1042a are larger than the second scattering particles 1024b in size. Here, FIG. 13 illustrates relative sizes, not illustrating comparison of absolute sizes.

The first scattering particles 1042a cause Mie scattering. The Mie scattering refers to scattering which is subject to at least one of density, size and shape of particles, without rare affection by wavelengths of light. The Mie scattering will be explained with reference to FIG. 14.

The first scattering particles 1042a scatter light by affection of at least one of density, size and shape of particles. The first scattering particles 1042a are composed of particles each having a diameter in the range of 0.5 to 10 μm to generate the Mie scattering. Also, the first scattering particles 1042a may contain beads each having a diameter in the range of 0.5 to 10 μm.

When the first scattering particles 1042a are 0.5 μm or less in size, the first scattering particles 1042a may lower distinction of scattering, without being distinguished from the second scattering particles 1042b in view of a functional aspect of scattering light. Also, the first scattering particles 1042a which are 0.5 μm or less in size are difficult to disperse in the matrix 1043. When the first scattering particles 1042a are 10 μm or greater, it may be difficult to fully scatter light on a thin film (about 100 μm or less) which is made of the quantum dot composite film 1040 and is likely to lower optical uniformity of the film. The first scattering particles 1042a may be made of at least one material selected from a group including silicon, alumina, titanium dioxide (TiO2), zirconia (ZrO2), barium sulfate, zinc oxide (ZnO), poly(methylmethacrylate) (PMMA) and benzoguanamine-based polymer.

The secondary scattering particles 1042b cause Rayleigh scattering. The Rayleigh scattering refers to scattering which is subject to the wavelengths of the light. The second scattering particles 1042b distinctively scatter light according to the wavelengths. The Rayleigh scattering will be explained later with reference to FIG. 15. The second scattering particles 1042b distinctively scatter light according to wavelengths by scattering primary light and not scattering secondary light.

The second scattering particles 1042b are formed to be smaller than wavelengths of light in size so as to be affected by the wavelengths of the light. The second scattering particles 1042b may be composed of particles each having a diameter in the range of 5 to 200 nm so as to cause the Rayleigh scattering. Also, the second scattering particles 1042b may be composed of beads each having a diameter in the range of 5 to 200 nm.

For maximization of effect, the second scattering particles 1042b are preferably composed of particles each having a diameter in the range of 5 to 50 nm. When the second scattering particles 1042b are 5 nm or less in size, the second scattering particles 1042b may be difficult to disperse in the matrix 1043 due to the extremely small size, and cause an increase in a unit cost of a product due to increased prices of raw materials. Also, when the second scattering particles 1042b are 50 nm or greater in size, the scattering particles 1042b may be similar to the first scattering particles 1042a in size due to their cohesion. If the second scattering particles 1042b become similar to the first scattering particles 1042a in size due to their cohesion, it may not show a difference from the first scattering particles 1042a in terms of the function.

The second scattering particles 1042b may be formed by cohesion of particles. In this instance, a diameter of the cohered particles may preferably not exceed 200 nm for the Rayleigh scattering. The second scattering particles 1042b may be formed of at least one selected from a group including silica, alumina, TiO2, ZrO2, barium sulfate and ZnO. The second scattering particles 1042b have a nano-size so as to be difficult to be formed of polymer, unlike the first scattering particles 1042a.

Since different types of scattering are derived according to the sizes of the scattering particles 1042, the quantum dot composite 1040 includes the first scattering particles 1042a and the second scattering particles 1042b having different particle sizes. Embodiments of the present invention may maximize efficiency of the quantum dot composite 1040 by virtue of the different types of scattering.

Hereinafter, description will be given of scattering mechanisms of the first scattering particles 1042a and the second scattering particles 1042b. Also, description will be given of scattering and excitation of light in the quantum dot composite 1040 including the first scattering particles 1042a and the second scattering particles 1042b.

Figure 14:
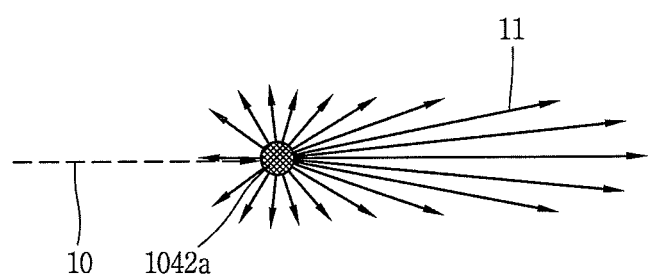
FIG. 14 is a conceptual view of Mie scattering associated with first scattering particles according to an embodiment of the invention.

FIG. 14 is a conceptual view illustrating Mie scattering associated with the first scattering particles 1042a. The first scattering particles 1042a whose particles are similar in size to the wavelengths of the light cause Mie scattering. As illustrated in FIG. 14, light is emitted toward the first scattering particles 1042a from a left-hand side. A reference numeral 10 denotes light incident onto the first scattering particles 1042a, and 11 denotes light scattered by the first scattering particles 1042a.

Here, a right-hand side of the first scattering particles 1042a may be classified into front scattering and a left-hand side of the first scattering particles 1042a may be classified into rear scattering. As illustrated in FIG. 14, for the Mie scattering, the front scattering generates relatively high energy and the rear scattering generates relatively low energy.

The Mie scattering is affected by at least one of density, size and shape of the particles, rather than the wavelengths of the light. Hence, the first scattering particles 1042a are rarely affected by the wavelengths of the light, and scatter light based on at least one of the density, the size and the shape of the particles.

With such rare affection by the wavelengths of light, the first scattering particles 1042a scatter blue light, green light and red light without distinction (classification) thereof. Accordingly, when a content of the first scattering particles 1042a gradually increases in the quantum dot composite 1040, the efficiency of the quantum dot composite 1040 may gradually increase. However, after a predetermined amount or concentration, the first scattering particles 1042a start to interfere with an extraction of secondary light and thus the efficiency of the quantum dot composite is reduced. Therefore, using only the first scattering particles 1042a has a limit to improving the efficiency of the quantum dot composite.

Figure 15:
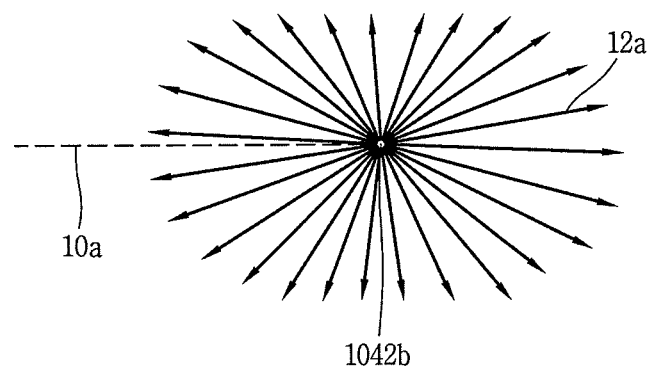
FIG. 15 is a conceptual view of Rayleigh scattering associated with second scattering particles according to an embodiment of the invention.

FIG. 15 is a conceptual view illustrating Rayleigh scattering associated with the second scattering particles 1042b. The second scattering particles 1042b are employed to overcome the limitations of the first scattering particles 1042a.

The second scattering particles 1042b whose particles are small in size than the wavelengths of the light cause Rayleigh scattering. As illustrated in FIG. 15, light is emitted toward the second scattering particles 1042b from a left-hand side. A reference numeral 10a denotes light incident onto the second scattering particles 1042b, and 12a denotes light scattered by the second scattering particles 1042b.

Here, a right-hand side of the second scattering particles 1042b may be classified into front scattering and a left-handed side of the second scattering particles 1042b may be classified into rear scattering. As illustrated in FIG. 15, for the Rayleigh scattering, the front scattering and the rear scattering generate similar energy.

The Rayleigh scattering is inversely proportional to 4 squares of the wavelength of the light. Hence, when the wavelength of the light becomes longer, a quantity of light is drastically reduced. Therefore, the second scattering particles 1042b are greatly affected by the wavelength of the light.

The second scattering particles 1042b scatter blue light with relatively short wavelengths. Further, the second scattering particles 1042b cannot scatter red light and blue light having relatively long wavelengths of light. In a structure employing LEDs emitting blue primary light as the light sources and employing green light-emitting quantum dot phosphors and red light-emitting quantum dot phosphors, the second scattering particles 1042b scatter the primary light. However, scattering of secondary light by the second scattering particles 1042b is limitative. Thus, the second scattering particles 1042b do not decrease an emission effect of the secondary light, unlike the first scattering particles 1042a. Also, upon using both of the first scattering particles 1042a and the second scattering particles 1042b, the efficiency of the quantum dot composite can be improved more than merely using the first scattering particles 1042a.

Figure 16:
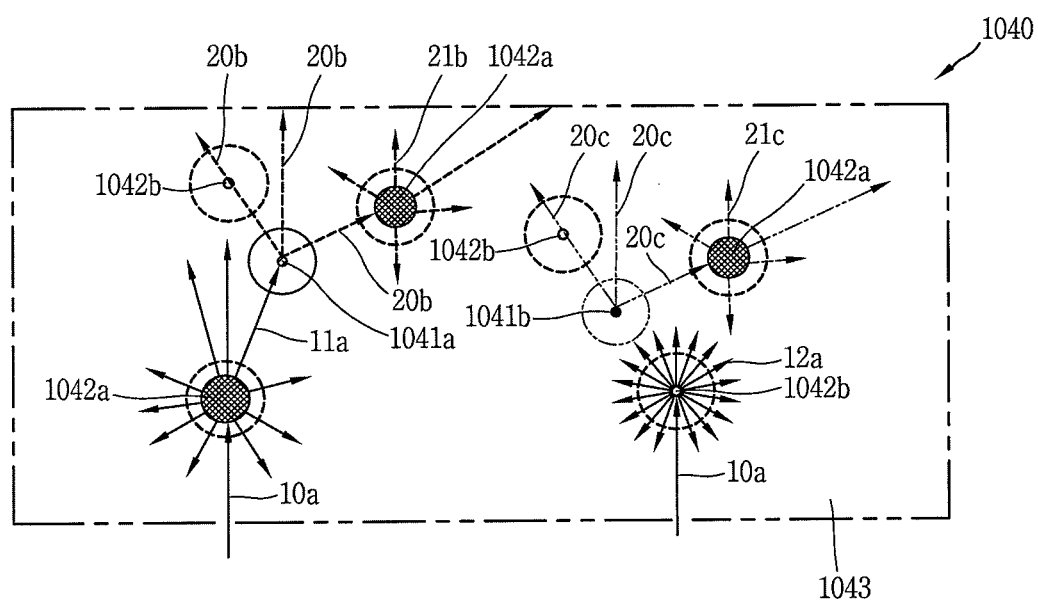
FIG. 16 is a conceptual view illustrating a propagation process of light in a quantum dot composite including first scattering particles and second scattering particles according to an embodiment of the invention.
Figure 17:
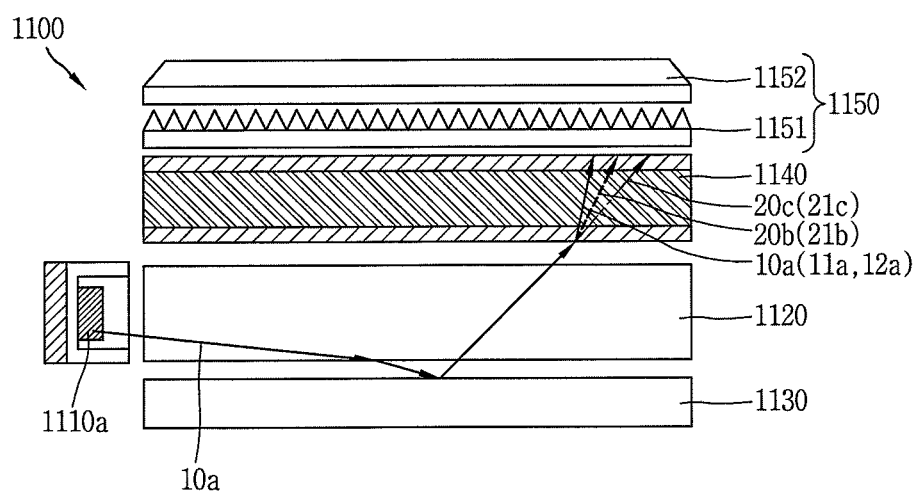
FIG. 17 is a conceptual view illustrating a propagation process of light when a quantum dot composite disclosed herein is applied to a backlight unit according to an embodiment of the invention.
Figure 18:
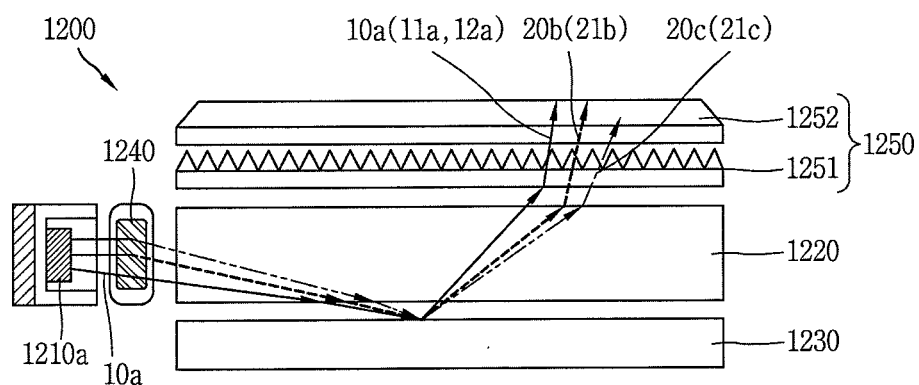
FIG. 18 is a conceptual view illustrating a propagation process of light when a quantum dot composite disclosed herein is applied to another backlight unit according to an embodiment of the invention.

FIG. 16 is a conceptual view illustrating a propagation process of light in the quantum dot composite 1040 including the first scattering particles 1042a and the second scattering particles 1042b. Arrows illustrated in FIG. 16 denote ongoing (or propagation) paths of light. Reference numerals complying with the following rules will be provided to the arrows of FIG. 16. FIGS. 17 and 18 use those reference numerals equally complying with the rules of FIG. 16.

(1) Reference numerals of primary light, such as light supplied from light sources or emitted from inorganic phosphors, have "1" for the tens digit. Reference numerals of secondary light emitted from the quantum dot phosphors 1041a, 1041b have "2" for the tens digit. For example, a reference numeral of the blue primary light supplied from the light sources is 10a.

(2) Reference numerals of primary light and secondary light prior to being scattered have "0" for the units/ones digit. Secondary light, which is emitted from the quantum dot phosphors 1041a, 1041b excited by already-scattered primary light has a reference numeral with "0" for the units/ones digit until being scattered by another scattering particle 1042a, 1042b. Reference numerals of the primary light and the secondary light scattered by the first scattering particles have "1" for the units/ones digit. Reference numerals of the primary light and the secondary light scattered by the second scattering particles 1042b have "2" for the units/ones digit. (3) Reference numerals of blue light, green light and red light have "a," "b," and "c," in a sequential manner.

As illustrated in FIG. 16, primary light 10a supplied from the light sources is blue light. When the blue primary light 10a is incident onto the quantum dot composite 1040, a portion of the primary light 10a may meet the quantum dot phosphors 1041a, 1041b, and another portion of the primary light 10a may meet the scattering particles 1042a, 1042b. Secondary light 20a, 20b, 21b, 20c, and 21c may preferably include at least one of green light 20b, 21b and red light 20c, 21c each having a longer wavelength than the primary light 10a, so as to be prevented from being scattered by the second scattering particles 1042b.

To scatter light, there should be a refractive index difference between the scattering particles 1042a, 1042b and the matrix 1043. It is preferable in embodiments of the present invention to set the refractive index difference more than 0.02 between the scattering particles 1042a, 1042b and the matrix 1043 for scattering light. When the refractive index difference is less than 0.02, it makes it difficult to scatter the primary light or the secondary light due to the extremely slight refractive index difference.

The first scattering particles 1042a cause Mie scattering and the primary light 10a incident onto the first scattering particles 1042a is scattered by the first scattering particles 1042a. A portion of the primary light 10a scattered by the first scattering particles 1042a may meet the quantum dot phosphors 1041a, 1041b, and another portion of the primary light 10a may meet other scattering particles 1042a, 1042b.

When the primary light 10a scattered by the first scattering particles 1042a is absorbed by the quantum dot phosphors 1041a, 1041b, the green or red secondary light 20b and 20c is emitted from the quantum dot phosphors 1041a, 1041b. Referring to FIG. 16, in response to the absorption of the scattered primary light 10a by the green light-emitting quantum dot phosphors 1041a, the green secondary light 20b is emitted from the green light-emitting quantum dot phosphors 1041a. A portion of the green secondary light 20b may meet other quantum dot phosphors 1041a, 1041b, and another portion of the green secondary light 20b may meet the scattering particles 1042a, 1042b. Here, the second scattering particles 1042b may prevent the secondary light 20b and 20c from being re-absorbed by other quantum dot phosphors, resulting in improvement of an extraction efficiency of the second light 20b and 20c.

The green secondary light 20b absorbed by the first scattering particles 1042a is scattered by the first scattering particles 1042a. This is because the first scattering particles 1042a are not affected by wavelengths of light. The green secondary light 21b scattered by the first scattering particles 1042a may meet the quantum dot phosphors 1041a, 1041b or meet another scattering particles 1042a, 1042b.

Further, the green secondary light 20b incident onto the second scattering particles 1042b is not scattered by the second scattering particles 1042b. This is because the second scattering particles 1042b are affected by the wavelengths of the light and the green secondary light 20b has a relatively longer wavelength than the blue primary light 10a.

The second scattering particles 1042b cause the Rayleigh scattering, and the primary light 10a incident onto the second scattering particles 1042b is scattered. The second scattering particles 1042b are affected by the wavelengths of the light. The primary light 10a is blue light and thus has a relatively shorter wavelength than the green light 20b and 21b and the red light 20c and 21 c. Therefore, the second scattering particles 1042b scatter the blue primary light 10a. A portion of primary light 12a scattered by the second scattering particles 1042b may meet the quantum dot phosphors 1041a, 1041b and another portion thereof may meet other scattering particles 1042a, 1042b.

When the primary light 12a scattered by the second scattering particles 1042b is absorbed by the quantum dot phosphors 1041a, 1041b, the green or red secondary light 20b and 20c is emitted from the quantum dot phosphors 1041a, 1041b. Referring to FIG. 16, as the scattered primary light 12a is absorbed by the red light-emitting quantum dot phosphors 1041b, red secondary light 20c is emitted from the red light-emitting quantum dot phosphors 1041b. A portion of the red secondary light 20c may meet other quantum dot phosphors 1041a, 1041b, and another portion thereof may meet other scattering particles 1042a, 1042b.

The red secondary light 20c incident onto the first scattering particles 1042a is scattered by the first scattering particles 1042a. The red secondary light scattered by the first scattering particles 1042a is indicated with a reference numeral 21c. This is because the first scattering particles 1042a are not affected by the wavelengths of the light. The red secondary light 21c scattered by the first scattering particles 1042a may meet the quantum dot phosphors 1041a, 1041b or meet other scattering particles 1042a, 1042b.

Further, the red secondary light 20c incident onto the second scattering particles 1042b is not scattered by the second scattering particles 1042b. This is because the second scattering particles 1042b are affected by the wavelengths of the light and the red secondary light 20c has a relatively longer wavelength than the blue primary light 10a.

Hereinafter, description will be sequentially given of a quantum dot composite formed in a shape of a film or a tube, and a propagation process of light in a backlight unit having the quantum dot composite. Scattering and excitation of the light will be understood with reference to FIG. 16, and the scattering and excitation of the light required for description of FIGS. 17 and 18 will be understood with reference to FIG. 16.

A quantum dot composite 1140 may be formed in a shape of a film (see FIG. 17). Also, a quantum dot composite 1240 may be formed in a shape of a tube (see FIG. 18). Quantum dot phosphors and scattering particles are dispersed in resin, and the resin is cured into a shape of a film, thereby generating a quantum dot composite film. Or, the quantum dot phosphors and the scattering particles are dispersed in resin, and the resin is cured into a shape of a tube, thereby generating a quantum dot composite tube. The resin forms the aforementioned matrix.

Examples of the resin in which the quantum dot phosphors and the scattering particles are dispersed may include thermosetting resin, photocurable resin, or dry-curable resin. The thermosetting resin and the photocurable resin are cured using heat and light, respectively. For the use of the dry hard resin, the resin is cured by applying heat to a solvent in which the quantum dot phosphors and the scattering particles are dispersed.

When the thermosetting resin or the photocurable resin is used, a composition of a film is equal to a composition of the raw material of the quantum dot composite. However, when the dry-curable resin is used, the composition of the film may be different from the composition of the raw material of the quantum dot composite. During the dry-curing by heat, the solvent is partially evaporated. Thus, a volume ratio of the scattering particles in the raw material of the quantum dot composite may be lower than a volume ratio of the scattering particles in the film.

Upon the curing of the resin, a volume contraction is caused. At least 2% to 3% and a maximum of about 20% of contraction are aroused from the thermosetting resin or the photocurable resin. The dry-curable resin is contracted even by several tens of percents. The contraction of the resin may cause movement of the quantum dot phosphors, which may be likely to bring about lowering of a degree of dispersion of the quantum dot phosphors in the quantum dot composite. However, embodiments of the present invention can maintain high dispersibility by preventing the movement of the quantum dot phosphors by virtue of the second scattering particles.

FIG. 17 is a conceptual view illustrating a propagation process (or emitting process) of light when the film-like quantum dot composite 1140 disclosed herein is applied to a backlight unit 1100. The quantum dot composite 1140 is spaced apart from LEDs 1110a to create a remote phosphor structure. As illustrated in FIG. 17, the quantum dot composite 1140 may be located between a light guide panel 1120 and an optical sheet 1150. The LEDs 1110a emit the blue primary light 10a. The light guide panel 1120 guides the primary light 10a. A reflection plate 1130 reflects the primary light 10a. The reflected primary light 10a is incident onto the quantum dot composite 1140 through the light guide panel 1120.

The quantum dot composite 1140 emits three primary lights using the primary light 10a. The quantum dot composite 1140 disclosed herein, as illustrated in FIGS. 13 and 16, may contain quantum dot phosphors (see 1141a and 1141b of FIG. 16, which are equally used for description of FIGS. 17 and 18). The green light-emitting quantum dot phosphors 1141a are excited by the blue primary light 10a so as to emit green secondary light 20b. The red light-emitting quantum dot phosphors 1041b are excited by the blue primary light 10a so as to emit red secondary light 20c. The quantum dot composite 1140 thus emits the blue primary light 10a, 11 a, 12a, the green secondary light 20b, 21b, and red secondary light 20c, 21c. Therefore, the backlight unit 1100 may emit white light by a combination (mixture) of the blue primary light 10a, 11 a, 12a, the green secondary light 20b, 21b and the red secondary light 20c, 21c.

The scattering particles (refer to 1042a and 1042b of FIG. 16, which will be equally used for description of FIGS. 17 and 18) include the first scattering particles 1042a and the second scattering particles 1042b. The first scattering particles 1042a scatter the blue primary light 10a, the green secondary light 20b, 21b and the red secondary light 20c, 21c. The second scattering particles 1042b distinctively scatter light according to the wavelengths of the light. The Rayleigh scattering by the second scattering particles 1042b is inversely proportional to 4 squares of the wavelength. Therefore, the second scattering particles 1042b scatter the blue primary light 10a, 11a, 12b with relatively short wavelengths, but rarely scatter the green secondary light 20b and the red secondary light 20c which have relatively long wavelengths.

Those of the blue light 10a, 11a and 12a emitted from the quantum dot composite 1140 include non-scattered primary light 10a, primary light 11a scattered by the first scattering particles 1042a, and primary light 12a scattered by the second scattering particles 1042b. Those of the green light 20b and 21b emitted from the quantum dot composite 1140 include non-scattered secondary light 20b and secondary light 21b scattered by the first scattering particles 1042a. Those of the red light 20c and 21c emitted from the quantum dot composite 1140 include non-scattered secondary light 20c, secondary light 21c scattered by the first scattering particles 1042a.

The quantum dot composite 1140 generated in the form of the film may replace the function of a diffusion plate through the scattering of the light by use of the scattering particles 1042a, 1042b. That is, when more light is scattered by the scattering particles 1042a, 1042b, such light can be spread naturally. Therefore, when the quantum dot composite 1140 is applied to the backlight unit 1100, the backlight unit 1100 may not need to employ the diffusion plate and thusly be made slimmer. The diffusion plate will be understood by the foregoing description.

The quantum dot composite 1140 using both the first scattering particles 1042a and the second scattering particles 1042b generates more scattering of the blue light 10a, 11a and 12a. This may result in reducing transmittance of the wavelengths of the blue light 10a, 11a and 12a in the quantum dot composite 1140 (see FIG. 19).

FIG. 18 is a conceptual view illustrating a propagation process of light when the quantum dot composite 1240 disclosed herein is applied to another backlight unit 1200. The quantum dot composite 1240 is formed in a shape of a tube. The quantum dot composite 1240 is spaced apart from the light sources to create a remote phosphor structure. As illustrated in FIG. 18, the quantum dot composite 1240 may be located between LEDs 1210a and a light guide panel 1220. The LEDs 1210a emit blue primary light 10a. The quantum dot composite 1240 emits three primary lights using the primary light 10a. The quantum dot composite 1240 disclosed herein, as illustrated in FIG. 16, includes the quantum dot phosphors 1041a and 1041b, and the scattering particles 1042a and 1042b.

The quantum dot phosphors 1041a and 1041b are excited by the primary light 10a so as to emit secondary light 20b, 20c each having a different wavelength from the primary light 10a. The green light-emitting quantum dot phosphors 1041a are excited by the blue primary light 10a so as to emit the green secondary light 20b. The red light-emitting quantum dot phosphors 1041b are excited by the blue primary light 10a so as to emit the red secondary light 20c. The quantum dot composite 1240 thus emits the blue primary light 10a, 11a and 12a, the green secondary light 20b and 21b, and the red secondary light 20c and 21c. The backlight unit 1120 may accordingly emit white light by a combination (or mixture) of the blue primary light 10a, 11a and 12a, the green secondary light 20b and 21b, and the red secondary light 20c and 21c.

Those of the blue light 10a, 11a and 12a emitted from the quantum dot composite 1240 include non-scattered primary light 10a, primary light 11a scattered by the first scattering particles 1042a, and primary light 12a scattered by the second scattering particles 1042b. Those of the green light 20b and 21b emitted from the quantum dot composite 1240 include non-scattered secondary light 20b and secondary light 21b scattered by the first scattering particles 1042a. Those of the red light 20c and 21c emitted from the quantum dot composite 1240 include non-scattered secondary light 20c, and secondary light 21c scattered by the first scattering particles 1042a.

The light guide panel 1220 guides the primary light 10a, 11a and 12a and the secondary light 20b, 21b, 20c and 21c. The reflection plate 1230 reflects the primary light 10a, 11a and 12a and the secondary light 20b, 21b, 20c and 21c. The reflected primary light 10a, 11a and 12a and secondary light 20b, 21b, 20c and 21c are incident onto the optical sheet 1250 through the light guide panel 1220.

When the first scattering particles 1042a and the second scattering particles 1042b are applied to the tube-like quantum dot composite 1240, scattering of the blue light 10a, 11a and 12a increases. Specifically, upon applying the second scattering particles 1042b made of the inorganic material, it may result in improvement of a radiation characteristic. The radiation characteristic may affect reliability of a product.

FIGS. 17 and 18 have illustrated the remote phosphor structure in which the quantum dot composite 1140, 1240 is spaced apart from the light sources. However, the quantum dot composite disclosed herein may not be limited to the remote phosphor structure. The quantum dot composite, for example, may be encapsulated on (or may encapsulate) LEDs. In more detail, quantum dot phosphors may be dispersed in resin containing the first scattering particles and the second scattering particles, and the resin may be cured, so as to encapsulate the quantum dot composite on the LEDs.

Figure 19:
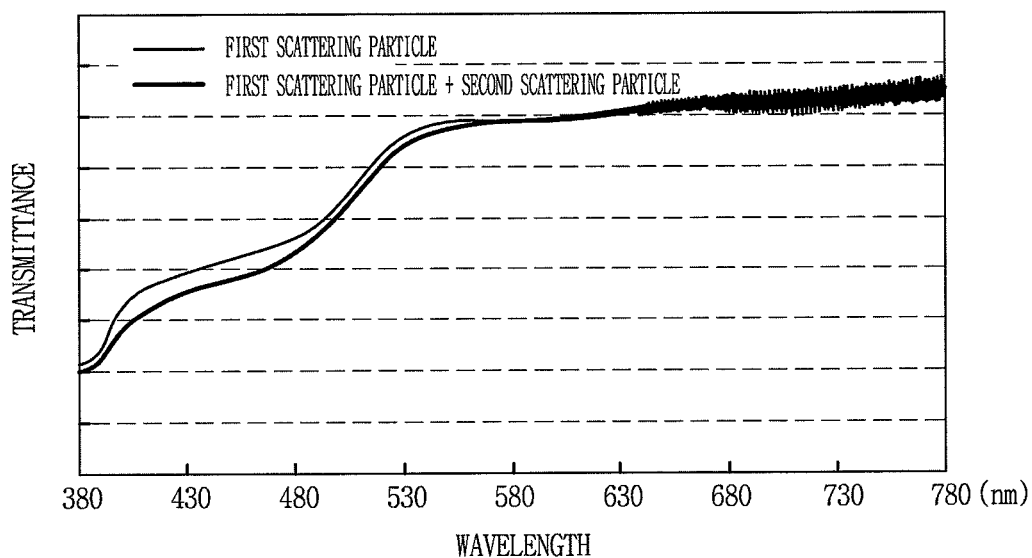
FIG. 19 is a graph comparing transmittances of quantum dot composites according to an embodiment of the invention.

FIG. 19 is a graph comparing transmittances of quantum dot composites. In FIG. 19, objects to be compared include a quantum dot composite employing first scattering particles without second scattering particles, and a quantum dot composite employing both the first scattering particles and the second scattering particles. Also, in FIG. 19, a horizontal axis of the graph denotes wavelengths of light, and a vertical axis denotes transmittances of light incident onto the quantum dot composites.

The effects of the scattering particles can be checked by comparing transmittances for each wavelength. A reduction of the transmittance means more scattering occurred. FIG. 19 illustrates the wavelength-based transmittance of the quantum dot composite employing both the first scattering particles and the second scattering particles disclosed herein, and also illustrates comparison results between the quantum dot composite employing both the first and second scattering particles and the quantum dot composite using only the first scattering particles for confirming the effect obtained by the second scattering particles.

The wavelength of blue light is in the range of about 430 to 490 nm. The wavelength of green light is in the range of about 490 to 570 nm, and the wavelength of red light is in the range of about 650 to 760 nm. It can be noticed in FIG. 19 that transmittance is reduced in the blue light range and there is relatively little transmittance change in the green light region and the red light region upon the use of both the first scattering particles and the second scattering particles.

Therefore, it can be understood that the second scattering particles can generate selective scattering according to wavelengths of light. Also, the quantum dot composite employing both of the first scattering particles and the second scattering particles generates more scattering of blue light, so as to improve efficiency of the quantum dot composite.

The reduced transmittance of the quantum dot composite may be understood as increased reflectivity. As illustrated in FIG. 17, when the film-like quantum dot composite has high reflectivity by virtue of the second scattering particles, the number of recycling light can be reduced. The reduction of the number of recycling light may result in a reduction of light loss which is caused during the recycling process. Therefore, the second scattering particles can improve optical efficiency of the quantum dot composite.

Figure 20:
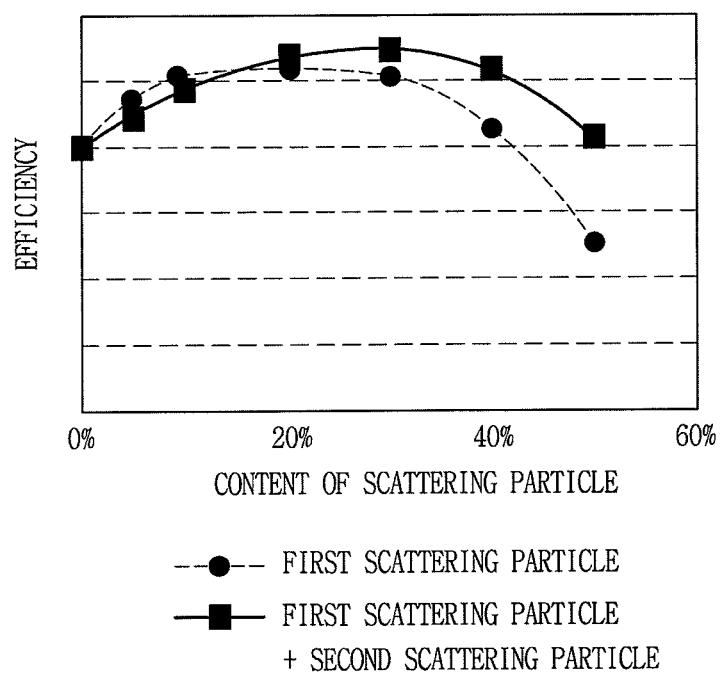
FIG. 20 is a graph comparing efficiencies of quantum dot composites according to a content of scattering particles according to an embodiment of the invention.

FIG. 20 is a graph comparing efficiencies of quantum dot composites according to a content of scattering particles. In FIG. 20, objects to be compared include a quantum dot composite employing first scattering particles without second scattering particles, and a quantum dot composite employing both the first scattering particles and the second scattering particles. Also, in FIG. 20, a horizontal axis of the graph denotes a content of scattering particles in the quantum dot composite, and a vertical axis denotes efficiency of the quantum dot composite. Here, the efficiency refers to quantum efficiency.

In measurements of FIG. 20, for the quantum dot composite employing the first scattering particles without the second scattering particles, the first scattering particles are made of silicon. For the quantum dot composite employing both of the first scattering particles and the second scattering particles, the first scattering particles are made of silicon and the second scattering particles are made of SiO2. Here, a volume ratio between the first scattering particles and the second scattering particles is 5:1.

Referring to FIG. 20, when the content of the scattering particles increases, the efficiency of the quantum dot composite increases to some degree. However, when the content of the scattering particles increases further, the increased efficiency is rather decreased. However, the degrees of the efficiency reduction of the two quantum dot composites are different from each other.

First of all, the efficiency of the quantum dot composite having only the first scattering particles will be described. The efficiency of the quantum dot composite starts to slowly decrease when the content of the scattering particles exceeds about 20%, and drastically decreases when the content of the scattering particles exceeds 30%. This is because green light and red light as well as blue light are scattered more in response to the increase in the content of the first scattering particles. Here, the first scattering particles interfere with an extraction of the green light and the red light.

Hereinafter, the efficiency of the quantum dot composite having both the first scattering particles and the second scattering particles will be described. The efficiency of the quantum dot composite does not decrease even though the content of the scattering particles exceeds 20%, and continuously increases until the content of the scattering particles is about 30%. Therefore, an additional increase in efficiency can be expected in the quantum dot composite employing both the first scattering particles and the second scattering particles, compared with the quantum dot composite only having the first scattering particles.

It can be noticed from the results of FIG. 20 that the efficiency of the quantum dot composite employing both the first scattering particles and the second scattering particles is higher than the efficiency of the quantum dot composite employing only the first scattering particles. It can also be understood that the content of the scattering particles affects the efficiency of the quantum dot composite.

Figure 21:
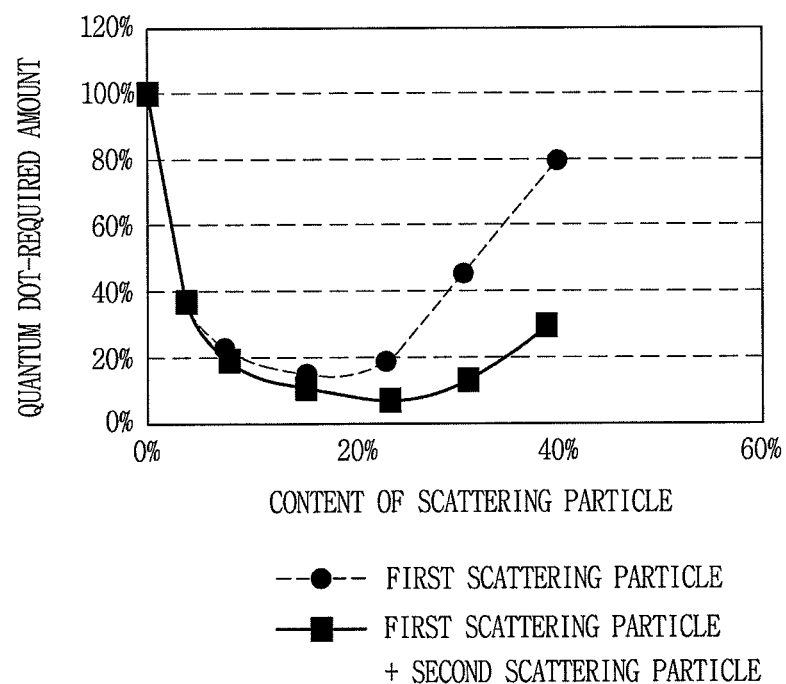
FIG. 21 is a graph comparing required amounts of quantum dot phosphors for implementing white light according to an embodiment of the invention.

FIG. 21 is a graph illustrating comparison results of required amounts of quantum dot phosphors (QD-required amount) for implementing white light. Color coordinates were based on x=0.290 and y=0.310.

In FIG. 21, a quantum dot composite employing first scattering particles without second scattering particles, and a quantum dot composite employing both the first scattering particles and the second scattering particles is compared. Also, in FIG. 21, a horizontal axis of the graph denotes a content of scattering particles in the quantum dot composite, and a vertical axis denotes a required amount of quantum dot phosphors. As the content of scattering particles in the quantum dot composite increases, a required amount of quantum dot phosphors for representing white color is gradually decreased and then increased again.

Compared with the quantum dot composite including the first scattering particles without the second scattering particles, the quantum dot composite including both the first scattering particles and the second scattering particles exhibits a smooth increase rate in the an amount of quantum dot phosphors required. Therefore, it means that the quantum dot composite including both the first scattering particles and the second scattering particles can represent the white color only by a remarkably smaller amount of quantum dot phosphors, compared with the quantum dot composite including only the first scattering particles without the second scattering particles. The quantum dot composite including both the first scattering particles and the second scattering particles can represent the white color only by a much smaller amount of quantum dot phosphors, which is reduced by about 20 to 30% rather than an amount of quantum dot phosphors required by the quantum dot composite including only the first scattering particles without the second scattering particles.

The smaller required amount of quantum dot phosphors indicates that the white color can be fully realized by the much smaller amount of quantum dot phosphors. The present invention may reduce the amount of quantum dot phosphors required, which may thus result in saving unit costs of the composite, improving the functionality of a backlight unit, and making the backlight unit slimmer.

It can be noticed from the results of FIGS. 20 and 21 that the content of the scattering particles affects the efficiency and performance of the quantum dot composite. The film-like or tube-like quantum dot composite preferably contains 1% to 30% first scattering particles by volume, and 0.1% to 20% second scattering particles by volume. When the contents of the first scattering particles and the second scattering particles exceed 40% by volume and 20% by volume, respectively, the efficiency of the quantum dot composite may decrease due to excessive scattering.

The volume percentages of the first scattering particles and the second scattering particles in the quantum dot composite may be measured in various ways. For example, a method of setting a random region, which is 5 cm across and 5 cm wide, in the film-like or tube-like quantum dot composite and measuring the volume percentages of the first scattering particles and the second scattering particles within the set region may be applied. If 1% to 40% first scattering particles by volume and 0.1% to 20% second scattering particles by volume are measured within the region, it may be determined that 1% to 40% first scattering particles by volume and 0.1% to 20% second scattering particles by volume are also measured on other regions of the film or tube. This method may be equally applied to measure a volume ratio between the quantum dot phosphors and the scattering particles in the quantum dot composite and to measure a volume ratio between the first scattering particles and the second scattering particles in the quantum dot composite.

As aforementioned, the scattering particles and the matrix preferably have a refractive index difference of 0.02 or more, and the content of the scattering particles depends on the refractive index. Therefore, the content of the scattering particles may be expressed by a function of the refractive index.

In more detail, the content of the first scattering particles is preferably more than $$\frac{2}{|n_{matrix} - n_{micro}|}$$

percent by volume, and less than $$\frac{4}{|n_{matrix} - n_{micro}|}$$

percent by volume. The content of the second scattering particles is preferably more than $$\frac{1}{|n_{matrix} - n_{nano}|}$$

percent by volume and less than $$\frac{3}{|n_{matrix} - n_{nano}|}$$

percent by volume. Here, $n_{matrix}$ denotes a refractive index of the matrix, $n_{micro}$ denotes a refractive index of the first scattering particles, and $n_{nano}$ denotes a refractive index of the second scattering particles.

When the content of the scattering particles is smaller than such limited value, it may cause a lowered scattering effect. Accordingly, it is difficult to expect an increase in efficiency of the quantum dot composite film or tube. Further, when the content of the scattering particles is greater than the limited value, it may cause a lowered transmittance. Accordingly, light extraction may become difficult and the efficiency may be lowered. Also, when the content of the scattering particles is more than an upper limit, an increase in thixotropy of the quantum dot composite film or tube may be caused, thereby lowering a coating characteristic.

The thixotropy refers to a characteristic that viscosity is lowered when shear stress is applied to a composite. When the thixotropy increases, a non-uniformity in thickness is caused or a defect, such as hole or pore, is generated during coating.

The volume ratio between the quantum dot phosphors and the scattering particles in the quantum dot composite is preferably 1:1 to 1:60. When the content of the scattering particles in the quantum dot composite is the same or more than the content of the quantum dot phosphors, the scattering particles may fully scatter the primary light.

The volume ratio between the first scattering particles and the second scattering particles is preferably 1:1 to 5:1 according to a desired optical characteristic of the quantum dot composite film or tube. The primary light and the second light are generally scattered by the first scattering particles, and the second scattering particles play a role of additionally scattering the primary light. Therefore, the content of the second scattering particles does not have to be greater than the content of the first scattering particles. The volume ratio between the first scattering particles and the second scattering particles may change into 1:1 to 5:1 for designing the optical characteristic desired for the film or tube.

The present invention may distinctively scatter light according to the wavelengths of light by use of second scattering particles, and maximize scattering of primary light by a combination of first scattering particles and the second scattering particles, which may result in a 3% to 5% improvement of absolute quantum efficiency of a quantum dot composite, and a reduction in fabricating costs and a size of a product.

Upon adding a saturation content of the first scattering particles and additionally adding the second scattering particles in the quantum dot composite, the second scattering particles may scatter the primary light so as to reduce recycling of light. Therefore, the second scattering particles may further increase the quantum efficiency of the quantum dot composite, which has not been obtained by using only the first scattering particles.

According to embodiments of the present invention with the configuration, a degree of scattering can change according to the wavelengths of the light by using the second scattering particles, thereby maximizing scattering of primary light and restricting scattering of secondary light. Also, the maximized scattering of the primary light may cause increased efficiency of quantum dot phosphors. Here, the increased efficiency of the quantum dot phosphors refers to an increased amount of light that the primary light converts into the secondary light.

In addition, by the increased efficiency of the quantum dot phosphors, white color can be represented by using a smaller amount of quantum dot phosphors than the related art, and interference with emission of the secondary light can be avoided. Accordingly, when the quantum dot composite disclosed herein is applied to a backlight unit, it may result in savings in the unit costs of the backlight unit and make the backlight unit slimmer in thickness.

The configurations and methods of the backlight unit and the display device having the same in the aforesaid embodiments may not be limitedly applied, but such embodiments may be configured by a selective combination of all or part of the embodiments so as to implement many variations. As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:
1. A backlight unit comprising:
 a plurality of light sources configured to emit primary light; and
 a quantum dot composite, wherein the quantum dot composite comprises:
quantum dot phosphors excited by the primary light supplied from the plurality of light sources so as to emit secondary light having a different wavelength than the primary light; and
scattering particles configured to scatter at least one of the primary light and the secondary light,
wherein the scattering particles comprise:
first scattering particles configured to scatter the primary light and the secondary light; and
second scattering particles different from the first scattering particles in size and composed of particles each having a diameter in the range of 5 nm to 50 nm so as to selectively scatter the primary light only.

2. The backlight unit of claim 1, wherein the second scattering particles are smaller than the first scattering particles in size.

3. The backlight unit of claim 1, wherein the primary light contains blue light, and
wherein the secondary light contains at least one of green light and red light having a wavelength longer than that of the primary light.

4. The backlight unit of claim 1, wherein the first scattering particles include at least one of silicon, alumina, titanium dioxide (TiO2), zirconia (ZrO2), barium sulfate, zinc oxide (ZnO), poly(methylmethacrylate) (PMMA) and benzoguanamine-based polymer, and
wherein the second scattering particles include at least one of silica, alumina, TiO2, ZrO2, barium sulfate and ZnO.

5. The backlight unit of claim 1, wherein each first scattering particle has a diameter in the range of 0.5 μm to 10 μm.

6. The backlight unit of claim 1, wherein the second scattering particles are generated by cohesion of the particles, and a diameter of the cohered particles does not exceed 200 nm.

7. The backlight unit of claim 1, wherein a volume ratio between the quantum dot phosphors and the scattering particles is 1:1 to 1:60.

8. The backlight unit of claim 1, wherein a volume ratio between the first scattering particles and the second scattering particles is 1:1 to 5:1.

9. The backlight unit of claim 1, wherein the quantum dot composite further comprises a matrix configured to support the quantum dot phosphors and the scattering particles, and
wherein the matrix includes a cured thermosetting resin, a photocurable resin or a dry- curable resin.

10. The backlight unit of claim 9, wherein the quantum dot composite includes a film or a tube, and
wherein 1% to 40% of the first scattering particles by volume are contained in the film or the tube, and
wherein 0.1% to 20% of the second scattering particles by volume are contained in the film or the tube.

11. The backlight unit of claim 9, wherein a content of the first scattering particles in the scattering particles is more than $$\frac{2}{|n_{matrix} - n_{micro}|}$$

percent by volume, and less than $$\frac{4}{|n_{matrix} - n_{micro}|}$$

percent by volume, wherein a content of the second scattering particles of the scattering particles is more than $$\frac{1}{|n_{matrix} - n_{nano}|}$$

percent by volume and less than $$\frac{3}{|n_{matrix} - n_{nano}|}$$

percent by volume,
wherein a sum of the first scattering particle and the second scattering particle of the scattering particles is 100 percent or less by volume,
where $n_{matrix}$ denotes a refractive index of the matrix, $n_{micro}$ denotes a refractive index of the first scattering particles, and $n_{nano}$ denotes a refractive index of the second scattering particles.

12. The backlight unit of claim 1, wherein the plurality of light sources comprises light-emitting diodes configured to emit the primary light, and
wherein the quantum dot composite is encapsulated on the light-emitting diodes.

13. The backlight unit of claim 1, wherein the quantum dot composite includes a film or a tube, and arranged spaced apart from the plurality of light sources.

14. The backlight unit of claim 1, wherein the plurality of light sources comprises light-emitting diodes configured to emit blue primary light, and
wherein the quantum dot composite comprises:
green light-emitting quantum dot phosphors excited by the blue primary light supplied from the plurality of light sources so as to emit green secondary light; and
red light-emitting quantum dot phosphors excited by the blue primary light supplied from the plurality of light sources so as to emit red secondary light.

15. The backlight unit of claim 1, wherein the plurality of light sources comprises light-emitting diodes configured to emit blue primary light,
wherein the backlight unit further comprises green light-emitting inorganic phosphors encapsulated on the light-emitting diodes to emit green primary light using the blue primary light, and
wherein the quantum dot composite comprises red light-emitting quantum dot phosphors excited by the primary light supplied from the plurality of light sources or the green primary light supplied from the green light-emitting inorganic phosphors, so as to emit red secondary light.

16. The backlight unit of claim 1, wherein the plurality of light sources comprises light-emitting diodes configured to emit blue primary light,
wherein the backlight unit further comprises red light-emitting inorganic phosphors encapsulated on the light-emitting diodes so as to emit red primary light using the blue primary light, and
wherein the quantum dot composite comprises green light-emitting quantum dot phosphors excited by the blue primary light supplied from the plurality of light sources so as to emit green secondary light.

17. A display device comprising:
a liquid crystal panel; and
a backlight unit configured to emit light to a rear surface of the liquid crystal panel,
wherein the backlight unit comprises:
a plurality of light sources configured to emit primary light; and
a quantum dot composite,
wherein the quantum dot composite comprises:
quantum dot phosphors excited by the primary light supplied from the plurality of light sources to emit secondary light having a different wavelength than the primary light; and
scattering particles configured to scatter at least one of the primary light and the secondary light, and
wherein the scattering particles comprise:
first scattering particles configured to scatter the primary light and the secondary light; and
second scattering particles different from the first scattering particles in size and composed of particles each having a diameter in the range of 5 to 50 nm so as to selectively scatter the primary light only.

18. The display device of claim 17, wherein the plurality of light sources comprises light-emitting diodes configured to emit blue primary light, and
wherein the quantum dot composite comprises:
green light-emitting quantum dot phosphors excited by the blue primary light supplied from the plurality of light sources so as to emit green secondary light; and
red light-emitting quantum dot phosphors excited by the blue primary light supplied from the plurality of light sources so as to emit red secondary light.

19. The display device of claim 17, wherein the plurality of light sources comprises light-emitting diodes configured to emit blue primary light,
wherein the backlight unit further comprises green light-emitting inorganic phosphors encapsulated on the light-emitting diodes to emit green primary light using the blue primary light, and
wherein the quantum dot composite comprises red light-emitting quantum dot phosphors excited by the primary light supplied from the plurality of light sources or the green primary light supplied from the green light-emitting inorganic phosphors, so as to emit red secondary light.

20. The display device of claim 17, wherein the plurality of light sources comprise light-emitting diodes configured to emit blue primary light,
wherein the backlight unit further comprises red light-emitting inorganic phosphors encapsulated on the light-emitting diodes so as to emit red primary light using the blue primary light, and
wherein the quantum dot composite comprises green light-emitting quantum dot phosphors excited by the blue primary light supplied from the plurality of light sources so as to emit green secondary light.

* * * * *